United States Patent
Yasuda et al.

(10) Patent No.: US 10,222,033 B2
(45) Date of Patent: Mar. 5, 2019

(54) VEHICLE LAMP HAVING A HOOKING STRUCTURE

(71) Applicant: KOITO MANUFACTURING CO., LTD., Tokyo (JP)

(72) Inventors: Yuji Yasuda, Shizuoka (JP); Takaaki Komatsu, Shizuoka (JP); Ippei Yamamoto, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 37 days.

(21) Appl. No.: 15/221,171

(22) Filed: Jul. 27, 2016

(65) Prior Publication Data

US 2017/0030547 A1 Feb. 2, 2017

(30) Foreign Application Priority Data

Jul. 27, 2015 (JP) ................. 2015-147547

(51) Int. Cl.
*F21V 19/00* (2006.01)
*F21S 41/19* (2018.01)
(Continued)

(52) U.S. Cl.
CPC .......... *F21V 19/003* (2013.01); *B60Q 1/0683* (2013.01); *F21S 41/19* (2018.01); *F21S 45/10* (2018.01); *F21S 45/47* (2018.01); *F21S 45/49* (2018.01); *F21S 41/147* (2018.01); *F21S 41/39* (2018.01); *F21Y 2115/10* (2016.08)

(58) Field of Classification Search
CPC ............. F21S 45/10; F21S 45/47; F21S 45/49
See application file for complete search history.

(56) References Cited

U.S. PATENT DOCUMENTS 9,885,455 B2 * 2/2018 Yamamoto ............. F21S 45/47
2011/0049749 A1 3/2011 Bailey et al.
(Continued)

FOREIGN PATENT DOCUMENTS

CN 201133990 Y 10/2008
CN 102269379 A 12/2011
(Continued)

OTHER PUBLICATIONS

Search Report issued in French Application No. 1657243, dated Aug. 17, 2018 (8 pages).

(Continued)

*Primary Examiner* — Suezu Ellis
(74) *Attorney, Agent, or Firm* — Osha Liang LLP

(57) ABSTRACT

A lamp includes a substrate, a heat-dissipation member, an optical member, and a heat-transfer member. The optical member, the substrate and the heat-dissipation member are arranged in this order. In two members of the heat-dissipation member and the optical member or two members of the heat-dissipation member and the substrate, one end sides thereof are fixed to each other by a fixing mechanism, and the other end sides thereof are hooked and fixed such that the two members are prevented from being displaced in a direction away from each other with the heat-transfer member located between the one end side and the other end side being a support point and the one end side being a force point.

9 Claims, 10 Drawing Sheets

VEHICLE FRONT       VEHICLE REAR

(51) Int. Cl.
*F21S 45/10* (2018.01)
*F21S 45/47* (2018.01)
*F21S 45/49* (2018.01)
*F21S 41/147* (2018.01)
*B60Q 1/068* (2006.01)
*F21Y 115/10* (2016.01)
*F21S 41/39* (2018.01)

(56) References Cited

U.S. PATENT DOCUMENTS

| | | |
|---|---|---|
| 2011/0050100 A1 | 3/2011 | Bailey et al. |
| 2011/0050101 A1 | 3/2011 | Bailey et al. |
| 2011/0050124 A1 | 3/2011 | Bailey et al. |
| 2011/0051414 A1 | 3/2011 | Bailey et al. |
| 2011/0286231 A1 | 11/2011 | Sugie |
| 2012/0287658 A1 | 11/2012 | Tanaka et al. |
| 2014/0009924 A1 | 1/2014 | Kotera et al. |

FOREIGN PATENT DOCUMENTS

| | | |
|---|---|---|
| CN | 102777842 A | 11/2012 |
| EP | 2470829 A2 | 7/2012 |
| JP | 2014-182896 A | 9/2014 |
| JP | 2015-046235 A | 3/2015 |
| WO | 2011/025928 A2 | 3/2011 |
| WO | 2013/111037 A2 | 8/2013 |

OTHER PUBLICATIONS

Office Action issued in Chinese Application No. 201610597374.5 dated Sep. 25, 2018 (11 pages).

* cited by examiner

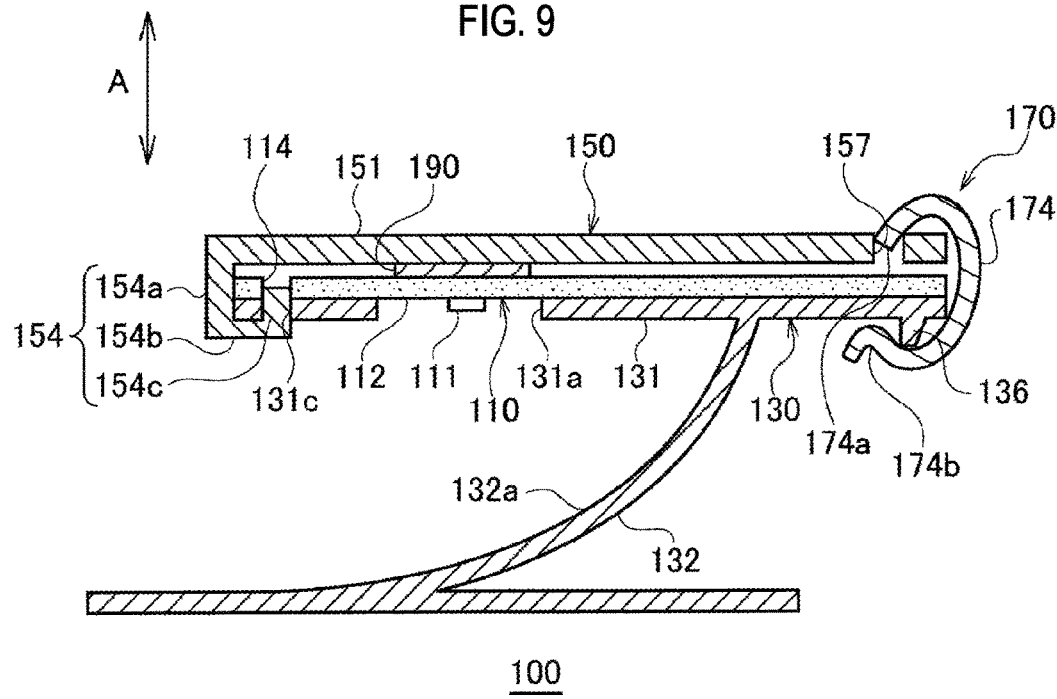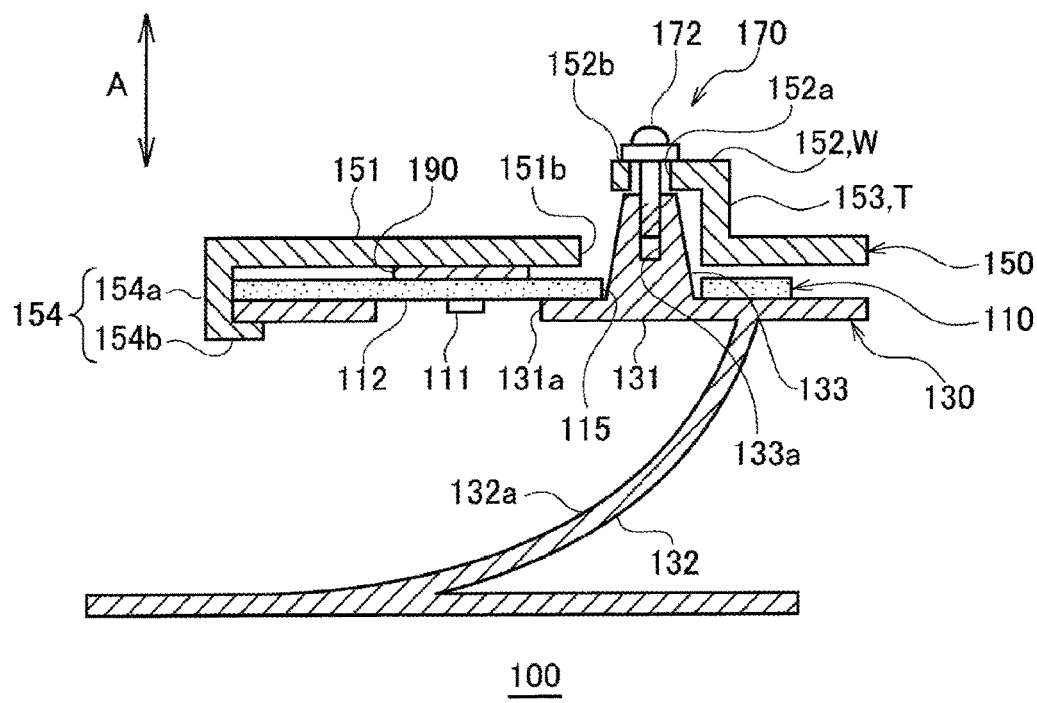

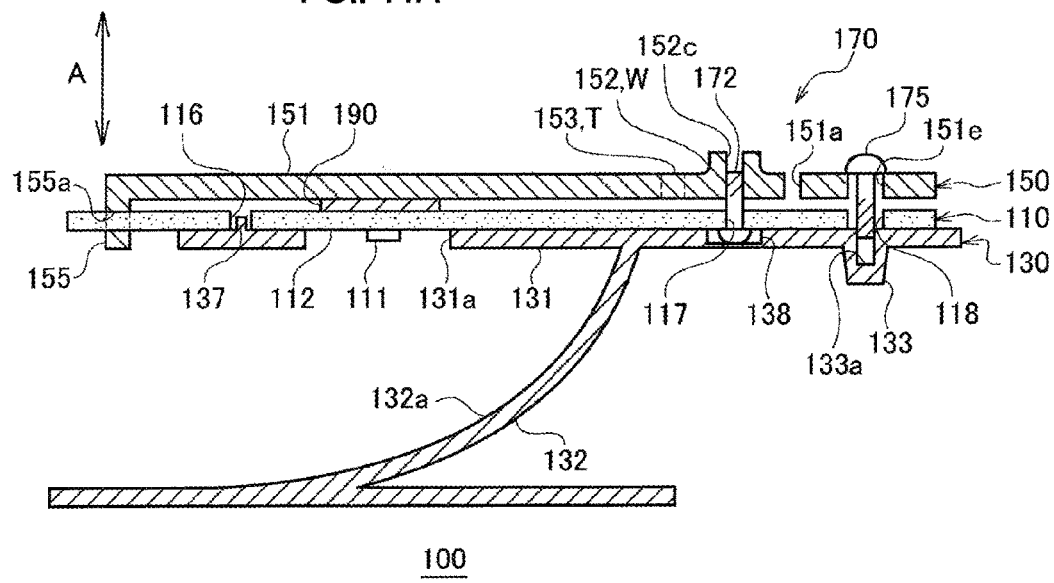
FGI. 11A
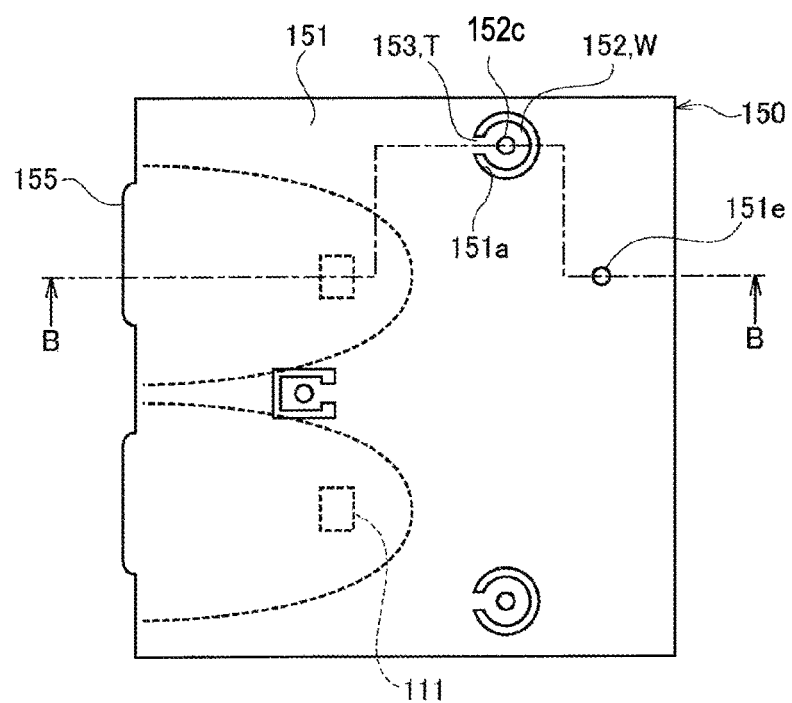
FIG. 11B

VEHICLE LAMP HAVING A HOOKING
STRUCTURE

CROSS-REFERENCE TO RELATED
APPLICATION

The present application claims priority from Japanese Patent Application No. 2015-147547 filed on Jul. 27, 2015, the entire content of which is incorporated herein by reference.

BACKGROUND

Technical Field

The present invention relates to a lamp.

Related Art there has been known a vehicle lamp which includes a substrate having an LED as a light source mounted thereon and a heat-dissipation plate disposed on the opposite side of a light source mounting surface of the substrate (e.g., see Patent Document 1). In this vehicle lamp, an insulation sheet is provided between the substrate and the heat-dissipation plate. In this way, the insulation and thermal conductivity between the substrate and the heat-dissipation plate are secured.

Patent Document 1: Japanese Patent Laid-Open Publication No. 2015-46235

In the vehicle lamp having the above-described structure, there is a possibility that the substrate is deformed when the substrate and the heat-dissipation plate are fixed to each other by fastening members such as screws. When the substrate is deformed, there is a risk that a positional deviation of the light source occurs. Further, the positional deviation of the light source may lead to a decrease in formation accuracy of a light distribution pattern.

In the vehicle lamp, a demand for improving the formation accuracy of the light distribution pattern has been increasing in recent years. Accordingly, there is a demand for suppressing the positional deviation of the light source, which can be a factor of reducing the formation accuracy of the light distribution pattern. Therefore, it is desirable to suppress the deformation of the substrate in order to suppress the positional deviation of the light source. Further, the demand for suppressing the positional deviation of the light source is not limited to a vehicle lamp but can be also applied to a general lighting.

SUMMARY

Exemplary embodiments of the invention provide a lamp which can suppress deformation of a substrate having a light source mounted thereon.

A lamp according to an exemplary embodiment of the invention, comprises:
a substrate having a light source mounting surface;
a heat-dissipation member configured to dissipate heat of a light source mounted on the light source mounting surface;
an optical member configured to deflect light emitted from the light source mounted on the light source mounting surface; and
a heat-transfer member having at least one of flexibility and elasticity and configured to transfer the heat of the light source mounted on the light source mounting surface from the substrate to the heat-dissipation member,
wherein the optical member, the substrate and the heat-dissipation member are arranged in this order,
the heat-transfer member is disposed at a position located between the substrate and the heat-dissipation member and overlapping with at least the light source mounted on the light source mounting surface, as seen from a stacked direction of the substrate and the heat-dissipation member,
in two members of the heat-dissipation member and the optical member or two members of the heat-dissipation member and the substrate,
one end sides thereof are fixed to each other by a fixing mechanism, and
the other end sides thereof are hooked and fixed such that the two members are prevented from being displaced in a direction away from each other with the heat-transfer member located between the one end side and the other end side being a support point and the one end side being a force point.

According to this aspect, it is possible to suppress the deformation of the substrate having the light source mounted thereon.

One of the two members may have a claw portion at the other end side and the other of the two members is hooked to the claw portion. Alternatively, one of the two members may include a locking portion extending substantially parallel to the stacked direction and having an opening, and an end of the other end side of the other of the two members may be inserted through the opening of the one of the two members so that and the other of the two members is thus hooked and fixed to the one of the two member.

According to these aspects, it is possible to suppress the deformation of the substrate.

The fixing mechanism may comprise a fastening member,
the heat-dissipation member has a first portion in contact with the heat-transfer member in a thermally conducting manner, a second portion having an insertion hole for the fastening member, and a connection portion to connect the first portion and the second portion to each other, and
the first portion and the second portion are spaced apart from each other at a region excluding the connection portion.

According to this aspect, it is possible to further suppress the deformation of the substrate.

The heat-dissipation member may have a narrow portion and a wide portion in a region from an end of the connection portion in contact with the first portion to the insertion hole of the second portion, a width of the narrow portion being narrower than a width of the wide portion.

According to this aspect, it is possible to further suppress the deformation of the substrate.

According to the present invention, it is possible to suppress deformation of a substrate having a light source mounted thereon.

BRIEF DESCRIPTION OF THE DRAWINGS

FIG. 9 is a sectional view schematically showing a lamp according to a sixth embodiment.

FIG. 10 is a sectional view schematically showing a lamp according to a seventh embodiment.

FIG. 11A is a sectional view schematically showing a lamp according to an eighth embodiment and FIG. 11B is a plan view schematically showing a heat-dissipation member included in the lamp according to the eighth embodiment.

DETAILED DESCRIPTION

Figure 1:
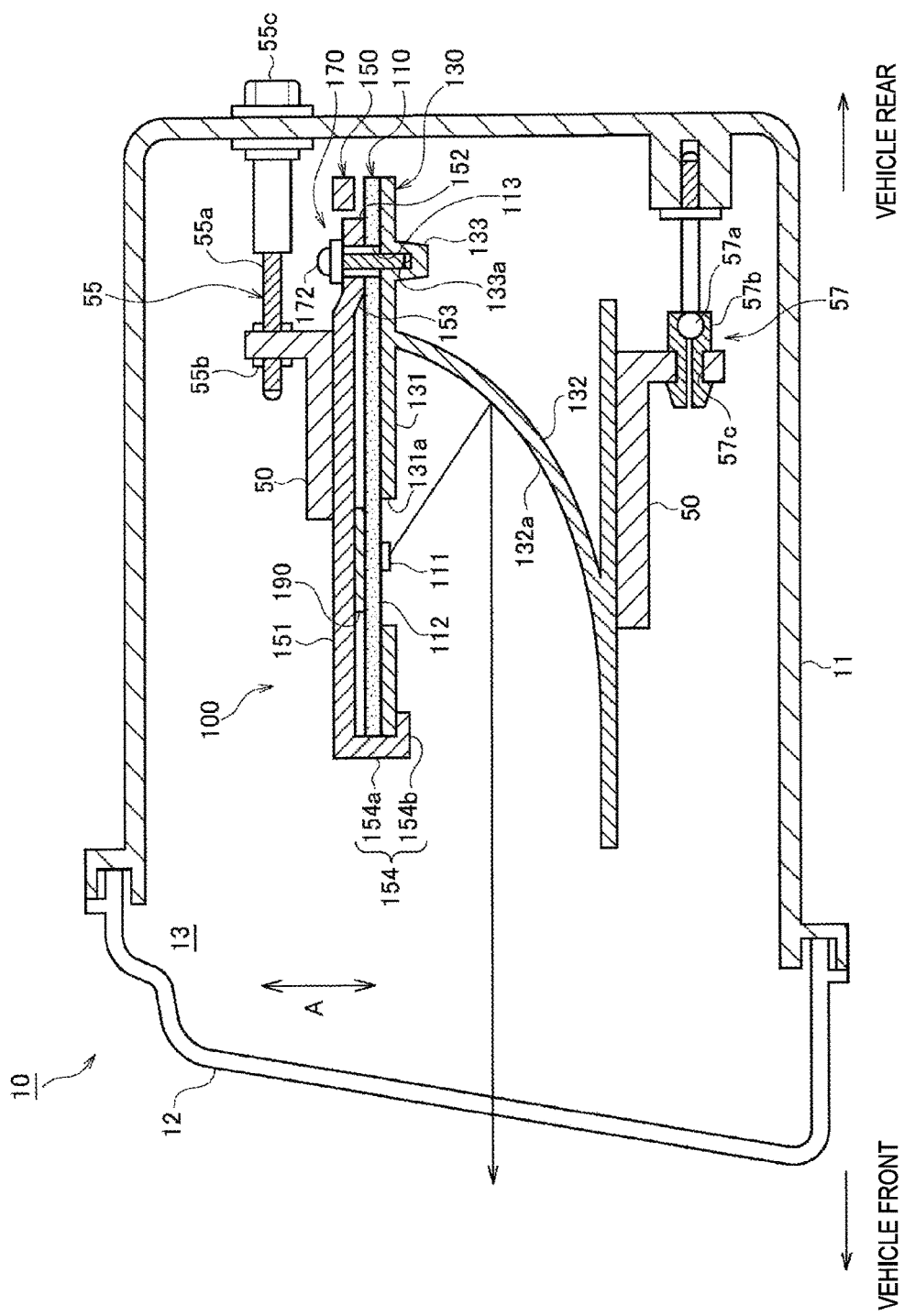
FIG. 1 is a sectional view schematically showing a vehicle headlamp device including a lamp according to a first embodiment.

Hereinafter, a preferred embodiment of the present invention will be described with reference to the drawings. The same or similar elements, members and process shown in each of the drawings are denoted by the same or similar reference numerals and a duplicated description thereof will be omitted, as appropriate. Further, the embodiment is illustrative and is not intended to limit the present invention. It should be noted that all the features and their combinations described in the embodiments are not necessarily considered as an essential part of the present invention. Further, the terms "first, second, etc." used in the present specification or claims do not represent any order or importance but are intended to distinguish one configuration from other configurations.

First Embodiment

Figure 2:
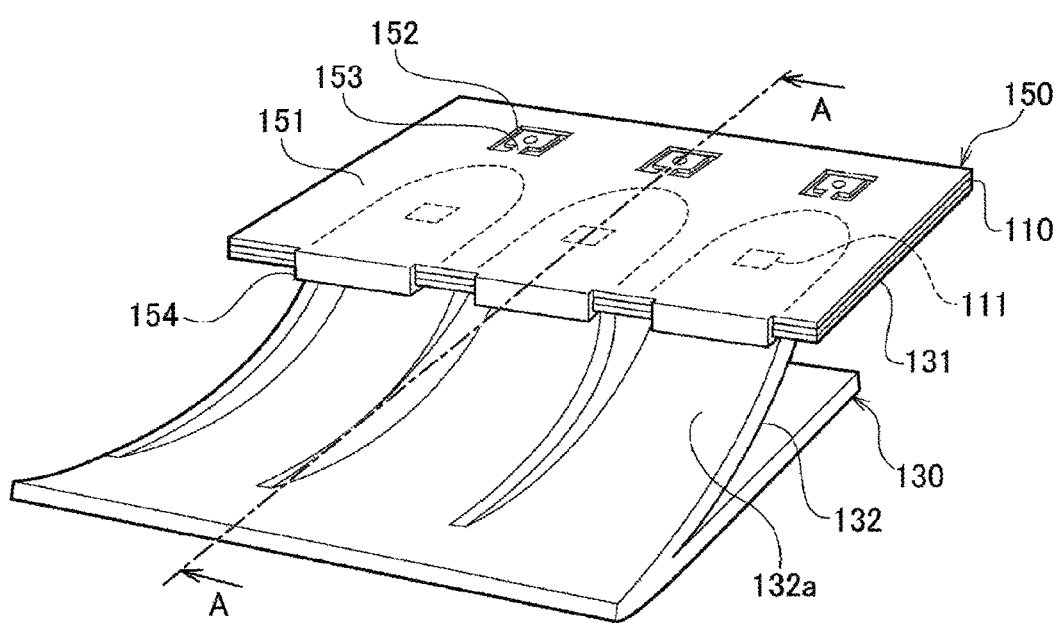
FIG. 2 is a perspective view schematically showing the lamp according to the first embodiment.
Figure 3A:
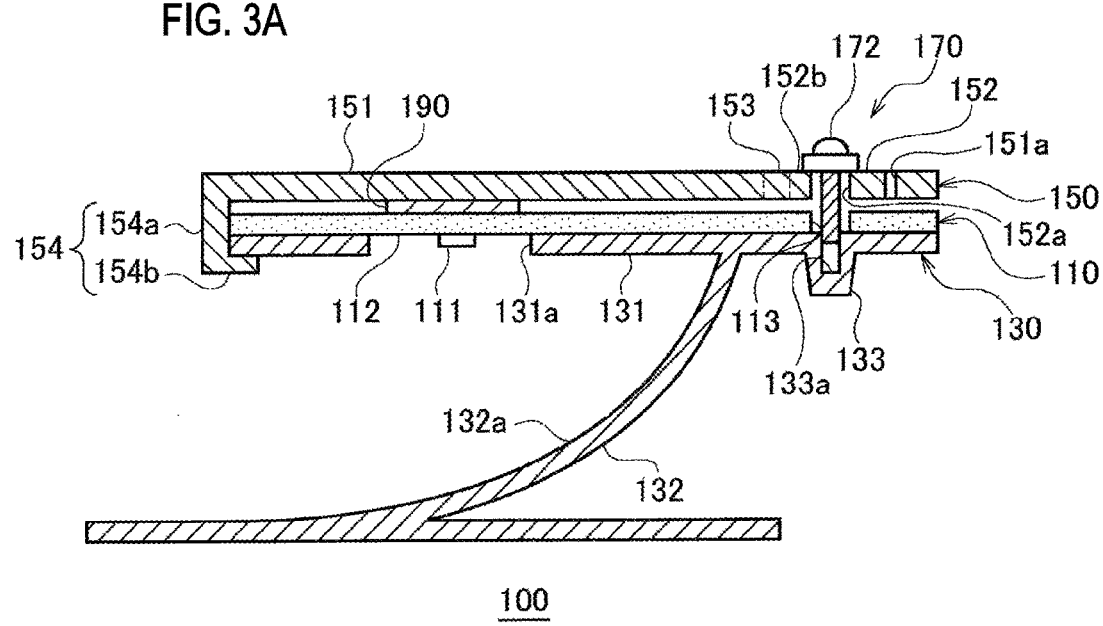
FIG. 3A is a sectional view taken along a line A-A shown in FIG. 2
Figure 3B:
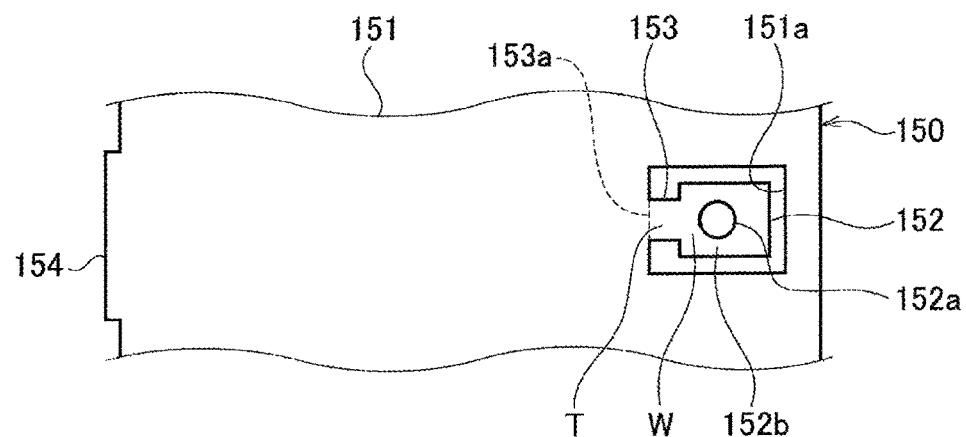
FIG. 3B is an enlarged plan view showing a portion of a heat-dissipation member included in the lamp according to the first embodiment.

FIG. 1 is a sectional view schematically showing a vehicle headlamp device including a lamp according to a first embodiment. FIG. 2 is a perspective view schematically showing the lamp according to the first embodiment. FIG. 3A is a sectional view taken along a line A-A shown in FIG. 2 and FIG. 3B is an enlarged plan view showing a portion of a heat-dissipation member included in the lamp according to the first embodiment. Meanwhile, FIG. 2 shows a state where a fixing mechanism is not fastened to the lamp. FIG. 3A shows a state where a fastening member of the fixing mechanism is not fastened. Scale or shape of each part shown in each drawing is conveniently set in order to facilitate explanation and should not be restrictively interpreted unless otherwise stated.

A lamp 100 (100A) according to the present embodiment is mounted on a vehicle headlamp device 10, for example. The vehicle headlamp device 10 has a pair of headlamp units disposed on the left and right sides of the vehicle front. Since the pair of headlamp units have substantially the same configuration except for having a bilaterally symmetrical structure, FIG. 1 shows one of the headlamp units as the vehicle headlamp device 10.

The vehicle headlamp device 10 includes a lamp body 11 and a transparent outer cover 12 to cover a front opening of the lamp body 11. The lamp body 11 and the outer cover 12 define a lamp chamber 13. The lamp 100 (also referred to as a lamp unit) is accommodated in the lamp chamber 13. The lamp 100 is configured to irradiate, for example, at least one of a high-beam light distribution pattern and a low-beam light distribution pattern.

The lamp 100 is supported on the lamp body 11 through a bracket 50. The bracket 50 is formed of, for example, a resin material. A first tilting member 55 and a second tilting member 57 are attached to the bracket 50. The first tilting member 55 includes an aiming screw 55a attached to the lamp body 11, a thread portion 55b provided in the bracket 50, and an adjustment portion 55c provided on the outside of the lamp body 11. One end side of the aiming screw 55a is inserted to the thread portion 55b and the other end side thereof is connected to the adjustment portion 55c.

The second tilting member 57 includes a ball joint 57a attached to the lamp body 11, a socket 57b to hold a ball of the ball joint 57a and a hole portion 57c provided in the bracket 50. The socket 57b is inserted into the hole portion 57c. Meanwhile, in the present embodiment, an aiming mechanism is connected to the bracket 50. However, the present invention is not particularly limited to this configuration. For example, the aiming mechanism may be directly connected to the lamp 100 without using the bracket 50.

When the aiming screw 55a is rotated via the adjustment portion 55c of the first tilting member 55, the bracket 50 is tilted with respect to the lamp body 11 with the ball of the ball joint 57a of the second tilting member 57 being a support point. In this way, an optical axis of the lamp 100 can be adjusted.

The lamp 100 includes a substrate 110 (110A), an optical member 130 (130A), a heat-dissipation member 150 (150A), a fixing mechanism 170 (170A) and a heat-transfer member 190. The optical member 130, the substrate 110 and the heat-dissipation member 150 are arranged in this order. The heat-transfer member 190 is disposed between the substrate 110 and the heat-dissipation member 150.

The substrate 110 is a substantially plate-like member for supporting a light source 111. The substrate 110 has a light source mounting surface 112. The light source 111 is mounted on the light source mounting surface 112. The light source 111 is, for example, an LED. More specifically, the light source 111 is, for example, a SMD-type LED package, and a size of a light emitting surface thereof is 1 $mm^2$. In the present embodiment, a major surface of the substrate 110 facing vertically downward is configured as the light source mounting surface 112. Further, the light source 111 is mounted on the light source mounting surface 112 in such a way that the light emitting surface faces vertically downward. A wiring pattern (not shown) is formed on the light source mounting surface 112. The light source 111 is electrically connected to the wiring pattern. A thickness of the substrate 110 is, for example, 1.6 mm.

The substrate 110 can be configured by, for example, a FR4 substrate. The FR4 substrate is a double-sided substrate having a conductive pattern provided on both sides thereof. Therefore, when the substrate 110 is configured by the FR4 substrate, the substrate 110 is thermally connected to the heat-dissipation member 150 via an insulation member, preferably, such as TIM (Thermal Interface Material).

Meanwhile, the lamp 100 of the present embodiment has a posture determined in such a way that the light emitting surface of the light source 111 faces vertically downward. However, the present invention is not particularly limited to this configuration. For example, the lamp 100 may have a posture determined in such a way that a normal of the light emitting surface of the light source 111 is parallel to a horizontal plane. Further, for example, the lamp 100 may take a state pivoted by 90 degree around the optical axis from the state shown in FIG. 1 and the light emitting surface of the light source 111 may face the side of the lamp. Alternatively, the lamp 100 may have a posture determined in such a way that the light emitting surface of the light source 111 faces vertically upward. An installation angle of the lamp 100 can be properly selected.

Further, the substrate 110 has an opening 113 at a region overlapping with a boss portion 133 (to be described later) in a stacked direction A (a direction shown in an arrow A of FIG. 1) of the optical member 130, the substrate 110 and the heat-dissipation member 150.

The optical member 130 is a member for deflecting light which is emitted from the light source 111 mounted on the light source mounting surface 112. In the present embodiment, the optical member 130 is a reflector for reflecting light which is emitted from the light source 111. Therefore, the lamp 100 of the present embodiment is a so-called reflective-type vehicle lamp. The optical member 130 is disposed on the light source mounting surface 112 side of the substrate 110. The optical member 130 has a flat plate-shaped base portion 131 in contact with the substrate 110 and a reflective portion 132 bent downward from the base portion 131 and extending toward the vehicle front.

The base portion 131 has an opening 131a for the light source at a region overlapping with the light source 111, as seen from the stacked direction A. A thickness of the base portion 131 is, for example, 2.0 to 3.0 mm. The reflective portion 132 has a reflective surface 132a for reflecting, toward the lamp front, light of the light source 111 mounted on the light source mounting surface 112. The reflective surface 132a is a surface having, for example, a paraboloid of revolution as a basic shape. A central axis of rotation of the paraboloid of revolution serves as an optical axis of the optical member 130. Therefore, the lamp 100 of the present embodiment is a so-called parabolic-type vehicle lamp.

The optical member 130 is arranged in such a way that an optical axis faces a vehicle longitudinal direction. The light source 111 is disposed in the opening 131a for the light source and a light emitting surface thereof is substantially opposite to the reflective surface 132a. A positional relationship between the light source 111 and the reflective surface 132a is determined in such a way that a focal point of the reflective surface 132a overlaps with the light source 111. Further, the optical member 130 has the boss portion 133.

The boss portion 133 is provided in the base portion 131 and protrudes to the side opposite to the substrate 110. The boss portion 133 is disposed on the rear side of the light source 111 in one end side of the optical member 130, in the present embodiment, in the rear end side (hereinafter, suitably referred to as "rear end side") in the longitudinal direction of the lamp 100. Further, the boss portion 133 is disposed on the rear side of the reflective portion 132. The boss portion 133 has a fastening hole 133a into which a fastening member 172 (to be described later) is screwed. The optical member 130 is formed by performing aluminum deposition on a region of, for example, a resin-molded substrate corresponding to at least the reflective surface 132a.

Meanwhile, the optical member 130 is not limited to the reflector but may be other optical member such as a projection lens. When the optical member 130 is a projection lens, the lamp 100 is a so-called PES optical system vehicle lamp. Further, the optical member 130 may be a combination of the projection lens and the reflector. Furthermore, the lamp 100 may be used as a direct-projection type vehicle lamp without including the optical member 130. Further, FIG. 2 shows a structure in which three sets of combinations of the light source 111 and the reflective portion 132 are included and arranged in the lamp lateral direction. However, the number and arrangement of the light source 111 and the reflective portion 132 are not particularly limited.

The heat-dissipation member 150 is a member which is formed of, for example, an aluminum plate, a steel plate or SUS and the like and dissipates heat generated from the light source 111 mounted on the light source mounting surface 112. When the heat-dissipation member 150 is provided, the heat-dissipation property of the light source 111 can be improved. The heat-dissipation member 150 is disposed on the side opposite to the light source mounting surface 112 of the substrate 110. The heat-dissipation member 150 has a first portion 151, a second portion 152, a connection portion 153 and a claw portion 154. A thickness of the heat-dissipation member 150 is, for example, 0.5 to 1.5 mm. In the present embodiment, the thickness of the first portion 151, the second portion 152, the connection portion 153 and the claw portion 154 is the same as each other. However, the present invention is not particularly limited to this configuration.

The first portion 151 has a flat plate shape and is in contact with the heat-transfer member 190 in a thermally conducting manner. The first portion 151 has an opening 151a at a region overlapping with the boss portion 133 in the stacked direction A.

The second portion 152 is disposed at a region overlapping with the opening 151a in the stacked direction A. Therefore, the second portion 152 is disposed at one end side (in the present embodiment, the rear end side) of the heat-dissipation member 150. The second portion 152 has an insertion hole 152a for the fastening member 172 (to be described later) and a fastening seat surface 152b disposed around the insertion hole 152a.

The connection portion 153 connects the first portion 151 and the second portion 152 to each other. The second portion 152 is connected to the first portion 151 through the connection portion 153. Therefore, the first portion 151 and the second portion 152 are spaced apart from each other at the region excluding the portion to which the connection portion 153 is connected.

The heat-dissipation member 150 can be formed by providing notches corresponding to the shape of the second portion 152 and the connection portion 153 at predetermined positions of, for example, an aluminum plate.

As shown in FIG. 3B, the heat-dissipation member 150 has a narrow portion T having a relatively narrow width and a wide portion W having a relatively wide width in the region from an end 153a of the connection portion 153 in contact with the first portion 151 to the insertion hole 152a of the second portion 152. For example, the region where the narrow portion T and the wide portion W are provided extends from the end 153a to an end of the insertion hole 152a closest to the connection portion 153. In the present embodiment, the entire of the connection portion 153 forms the narrow portion T and the entire of the second portion 152 forms the wide portion W. Here, the "width" of the narrow portion T and the wide portion W means a dimension in a direction perpendicular to a direction in which, for example, the end 153a and the end of the connection portion 153 in contact with the second portion 152 are arranged.

In other words, the heat-dissipation member 150 has a portion where two side surfaces are spaced away from each other in a stepwise manner toward the insertion hole 152a from the end 153a of the connection portion 153. These side surfaces refer to surfaces that connect a surface (major surface) of the connection portion 153 and the second portion 152 facing the substrate 110 and a surface (major surface) opposite to the surface. In the present embodiment, the two side surfaces are spaced away from each other in one step. However, the two side surfaces may be spaced away from each other in multiple steps. Further, a distance between the two side surfaces may be increased in a continuous manner. Further, the heat-dissipation member 150 may have a portion where the two side surfaces come close to each other in a stepwise manner or a continuous manner toward the insertion hole 152a from the end 153a. In this case, the narrow portion T is provided at a position spaced apart from the end 153a.

Further, an area of the cross section of the narrow portion T perpendicular to the direction in which the end 153a and the end of the connection portion 153 in contact with the second portion 152 are arranged is smaller than that of the cross section of the wide portion W perpendicular to the direction. Further, for example, a width of the narrow portion T is narrower than that of a region of the fastening seat surface 152b with which a head portion of the fastening member 172 is in contact. Meanwhile, the narrow portion T and the wide portion W may take various shapes and arrangements.

For example, the narrow portion T may be provided in a portion of the connection portion 153 or a portion of the second portion 152. In this case, the narrow portion T may be configured as a constricted portion formed by causing the side end of the connection portion 153 or the second portion 152 to be cut away and having a locally narrow width. In other words, the narrow portion T may have a shape in which two side surfaces are close to each other in a stepwise manner or a continuous manner toward the insertion hole 152a side from the end 153a side, and then, are spaced apart from each other in a stepwise manner or a continuous manner. Further, for example, the narrow portion T may be provided in the entire of the connection portion 153 and a portion of the second portion 152. Further, the entire of the second portion 152 may form the narrow portion T and the entire of the connection portion 153 may form the wide portion W. Further, an opening may be provided in the connection portion 153 or the second portion 152, and the narrow portion T may be configured by an edge portion of the opening.

The claw portion 154 is a portion which connects the optical member 130 and the heat-dissipation member 150 to each other by being hooked to an end of the optical member 130. The claw portion 154 is disposed in the other end side of the heat-dissipation member 150, in the present embodiment, in the front end side (hereinafter, suitably referred to as "front end side") in the longitudinal direction of the lamp 100. The light source 111 is disposed between the claw portion 154 and the second portion 152 in the longitudinal direction of the lamp 100. The claw portion 154 is formed by, for example, causing the front end of the first portion 151 to be folded back.

The claw portion 154 has a vertical portion 154a and a parallel portion 154b. The vertical portion 154a extends substantially parallel to the stacked direction A, in other words, in a direction intersecting with an extending direction of the first portion 151 or the substrate 110. The parallel portion 154b extends parallel to the base portion 131 from a lower end of the vertical portion 154a. Further, the vertical portion 154a extends toward the optical member 130 from the front end surface of the first portion 151, and the parallel portion 154b extends toward the boss portion 133 from the lower end surface of the vertical portion 154a. Therefore, the claw portion 154 has a substantially L-shaped cross section. Further, the front end (portion including the front ends of the first portion 151 and the claw portion 154) of the heat-dissipation member 150 has a substantially U-shaped cross section.

As the claw portion 154 is hooked to the front end of the base portion 131, the optical member 130 and the heat-dissipation member 150 are hooked and fixed. When the optical member 130 and the heat-dissipation member 150 are hooked and fixed, the substrate 110 sandwiched therebetween is also fixed. In the state where the optical member 130 and the heat-dissipation member 150 are hooked and fixed, the end surface of the base portion 131 facing the lamp front side is in contact with the vertical portion 154a and the major surface of the base portion 131 opposite to the substrate 110 is in contact with the parallel portion 154b. Meanwhile, in the present embodiment, the front end surface of the substrate 110 is also in contact with the vertical portion 154a.

The fixing mechanism 170 is a mechanism for fixing the optical member 130 and the heat-dissipation member 150 at one end side thereof, i.e., at an end side opposite to the end where both are hooked and fixed. When the optical member 130 and the heat-dissipation member 150 are fixed by the fixing mechanism 170, the substrate 110 sandwiched therebetween is also fixed. Although the fixing mechanism 170 may take any structure, the fixing mechanism 170 of the present embodiment has the fastening member 172. The fastening member 172 is, for example, a screw.

As shown in FIG. 1 or FIG. 3A, the substrate 110 and the heat-dissipation member 150 are disposed on the base portion 131 of the optical member 130. Further, the claw portion 154 is hooked to the front end of the optical member 130, and hence, the substrate 110 and the heat-dissipation member 150 are stacked on the base portion 131. In this state, the fastening hole 133a, the opening 113 and the insertion hole 152a are overlapped in the stacked direction A. Further, the fastening member 172 is inserted into the insertion hole 152a and the opening 113 and is fastened to the fastening hole 133a. The head portion of the fastening member 172 is in contact with the fastening seat surface 152b. In this way, the substrate 110, the optical member 130 and the heat-dissipation member 150 can be fixed to each other. A fixing structure of the substrate 110, the optical member 130 and the heat-dissipation member 150 will be described in detail below.

The heat-transfer member 190 is a member which transfers heat of the light source 111 mounted on the light source mounting surface 112 from the substrate 110 to the heat-dissipation member 150. The heat-transfer member 190 is disposed at a position located between the substrate 110 and the heat-dissipation member 150 and overlapping with the light source 111, as seen from the stacked direction A. Meanwhile, the heat-transfer member 190 may be disposed at a position overlapping with at least the light source 111, as seen from the stacked direction A. Therefore, the heat-transfer member 190 may be disposed at the entire region between the substrate 110 and the heat-dissipation member 150, for example. The heat-transfer member 190 has flexibility or elasticity.

For example, the heat-transfer member 190 is configured by an insulative heat-transfer sheet having flexibility or elasticity. Further, the heat-transfer member 190 may be configured by insulative TMI (Thermal Interface Material) such as thermal conductive grease or thermal conductive adhesive. When the heat-transfer member 190 is interposed between the substrate 110 and the heat-dissipation member 150, the thermal conduction between the substrate 110 and the heat-dissipation member 150 can be reliably secured, thereby improving the heat-dissipation property of the light source 111. When the heat-transfer member 190 is configured by the heat-transfer sheet, the heat-transfer member 190 is sandwiched and pressed between the substrate 110 and the heat-dissipation member 150. A thickness of the heat-transfer member 190 in the pressed state is, for example, 0.5 to 2.0 mm. When the heat-transfer member 190 is configured by the thermal conductive grease, the thermal conductive grease is applied on the substrate 110 or the first portion 151, and then, is spread by being sandwiched and pressed between the substrate 110 and the second portion 151. In this way, the heat-transfer member 190 having a thickness of, for example, 20 to 100 μm is formed.

Figure 4A:
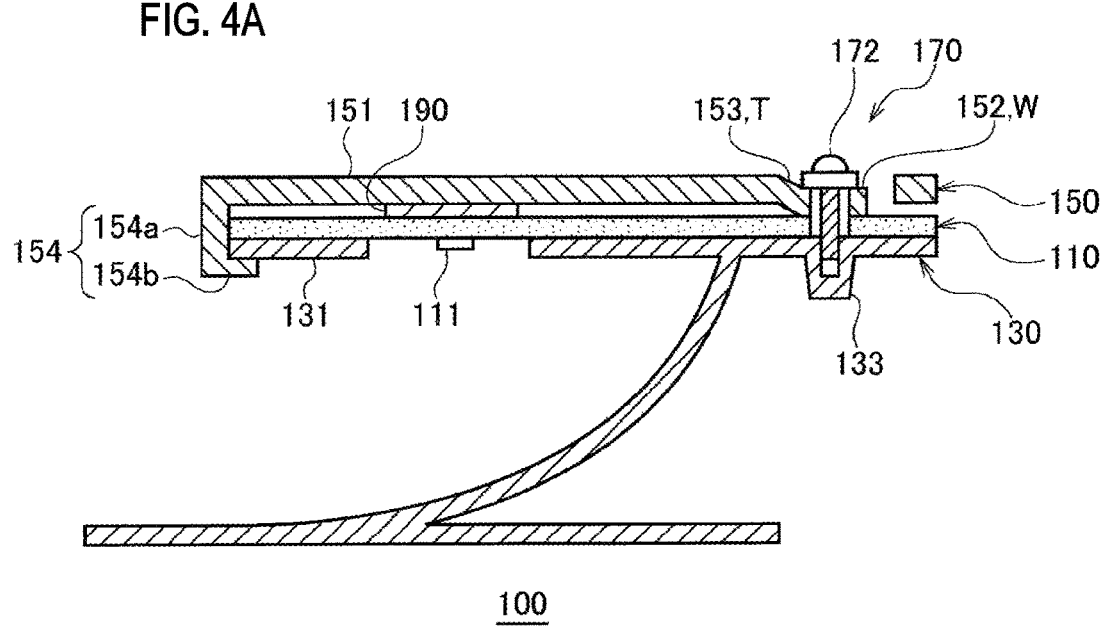
FIG. 4A is a sectional view schematically showing the lamp according to the first embodiment and FIG. 4B is a sectional view schematically showing a lamp according to a comparative example.

Next, a fixing structure of the substrate 110, the optical member 130 and the heat-dissipation member 150 is described in detail. FIG. 4A is a sectional view schematically showing the lamp 100 according to the first embodiment and FIG. 4B is a sectional view schematically showing a lamp according to a comparative example.

As shown in FIG. 4A, in the lamp 100 according to the present embodiment, the optical member 130 and the heat-dissipation member 150 are hooked and fixed at the front end sides thereof. Further, the optical member 130 and the heat-dissipation member 150 are fixed at the rear end sides thereof by the fastening member 172 of the fixing mechanism 170. The substrate 110 is sandwiched between the optical member 130 and the heat-dissipation member 150. As a result, the optical member 130 and the heat-dissipation member 150 are fixed to each other, and hence, these three members are fixed.

Figure 4B:
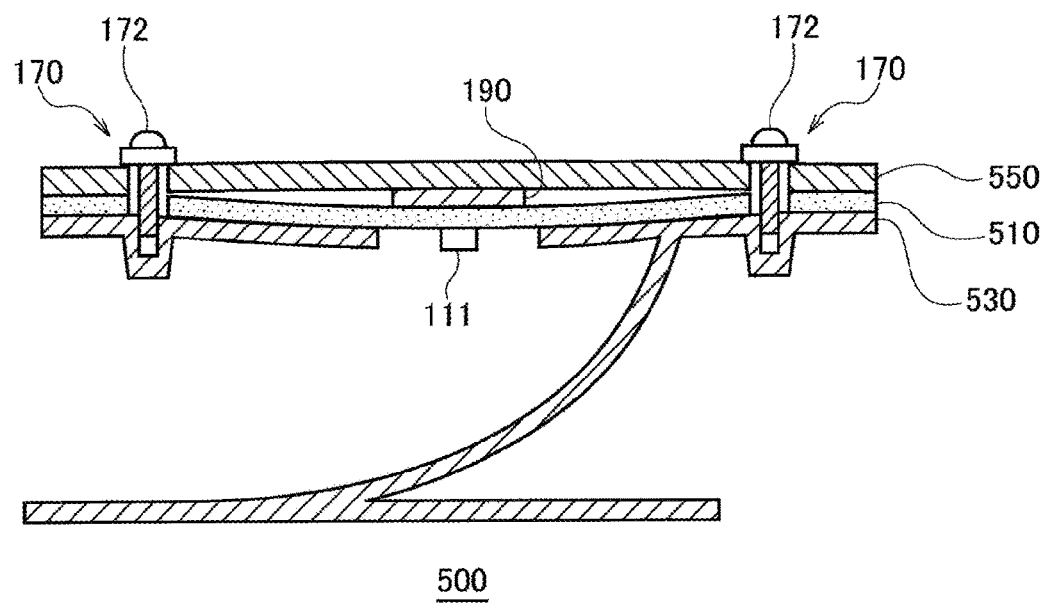

On the other hand, as shown in FIG. 4B, in a lamp 500 according to a comparative example, an optical member 530 and a heat-dissipation member 550 are fixed at both a front end side and a rear end side thereof by the fastening member 172. In a region where the fixing mechanism 170 is provided, a space corresponding to the thickness of the heat-transfer member 190 is provided between a substrate 510 and the heat-dissipation member 550. As a result, when the optical member 530 and the heat-dissipation member 550 are fixed to each other by the fastening member 172, the optical member 530, the substrate 510 and the heat-dissipation member 550 are displaced in a direction close to each other by the fastening of the fastening member 172.

Further, a compression reaction force of the heat-transfer member 190 is generated in an intermediate portion between the front end side and the rear end side. That is, a force in a direction in which the optical member 530, the substrate 510 and the heat-dissipation member 550 are spaced away from each other is generated in the intermediate portion. Therefore, when each part is fixed at both the front end side and the rear end side of the lamp 500 by the fastening member 172, deformation or deflection occurs in the substrate 510. Typically, when fixed by the fastening member 172, the substrate 510 and the heat-dissipation member 550 are displaced until being in contact with each other.

Meanwhile, the heat-transfer member 190 has flexibility or elasticity. As a result, even when the heat-transfer member 190 is present at an installation region of the fixing mechanism 170, the heat-transfer member 190 present in the installation region is compressed by the fastening of the fastening member 172, and hence, the optical member 530, the substrate 510 and the heat-dissipation member 550 are displaced in a direction close to each other. Consequently, the substrate 510 is deformed.

On the contrary, in the lamp 100 according to the present embodiment, the rear end sides of the optical member 130 and the heat-dissipation member 150 are fixed by the fixing mechanism 170 and the front end sides thereof are fixed by the hooked fixation. When the rear end sides of the optical member 130 and the heat-dissipation member 150 are fixed by the fastening member 172 in the state where the front end side of the optical member 130 is hooked by the claw portion 154 of the heat-dissipation member 150, a force in a direction in which the optical member 130 and the heat-dissipation member 150 are spaced away from each other with the rear end side being a force point and an intermediate portion of the front end side and the rear end side being a support point is applied to the front end side. More specifically, when a force in a direction in which the optical member 130 and the heat-dissipation member 150 are close to each other is applied to the rear end sides of the optical member 130 and the heat-dissipation member 150, a force in a direction in which the two members are spaced away from each other with the rear end side being a force point and the intermediate portion being a support point is applied to the front end.

A front end of the optical member 130 is hooked by the claw portion 154, so that the optical member 130 is prevented from being displaced in a direction away from the heat-dissipation member 150. That is, with the hooked fixation, the optical member 130 is prevented from being displaced in a direction in which the other end side is spaced away from the heat-dissipation member 150 with the heat-transfer member 190 located between the one end side and the other end side being a support point and the one end side being a force point. Relatively, the displacement of the heat-dissipation member 150 in a direction away from the optical member 130 is suppressed by the hooked fixation.

The claw portion 154 just suppresses the displacement of the optical member 130 in a direction away from the heat-dissipation member 150 but does not actively generate a force to allow the optical member 130 to approach the heat-dissipation member 150. Therefore, as compared to the case where each part is fixed by the fastening member 172, the distance among the optical member 130, the substrate 110 and the heat-dissipation member 150 to approach each other by the fixing can be more reliably reduced. As a result, the deformation of the substrate 110 can be more reliably reduced, as compared to the case where each part is fixed by the fastening member 172.

Meanwhile, the length of the vertical portion 154a of the claw portion 154 may be adjusted such that the substrate 110 and the first portion 151 are slightly deformed in a direction close to each other in a range where the substrate 110 and the first portion 151 are not in contact with each other. In this way, the contact of the substrate 110 and the heat-transfer member 190 and the contact of the heat-dissipation member 150 and the heat-transfer member 190 are secured while suppressing the deformation of the substrate 110. Therefore, it is possible to more reliably improve the heat-dissipation property of the light source 111. As compared to the case where each part is fixed by the fastening member 172, the deformation of the substrate 110 can be more reliably suppressed even when the length of the vertical portion 154a is adjusted as described above.

Further, in the present embodiment, the first portion 151 and the second portion 152 of the heat-dissipation member 150 are spaced apart from each other at the region excluding the portion to which the connection portion 153 is connected. In this way, the stress generated when the fastening member 172 is fastened can be prevented from being transmitted from the second portion 152 to the first portion 151. As a result, the deformation of the substrate 110 can be suppressed also in the rear end side of the substrate 110.

Furthermore, the heat-dissipation member 150 has the narrow portion T and the wide portion W in a region from the end 153a of the connection portion 153 to the insertion hole 152a of the second portion 152. By providing two regions having different widths, the narrow portion T having a relatively narrow width naturally becomes weaker than the wide portion W having a relatively wide width. Therefore, as shown in FIG. 4A, the narrow portion T is deformed by the stress generated when the fastening member 172 is fastened. In this way, the stress generated when the fastening member 172 is fastened can be absorbed in the narrow portion T. As a result, the deformation in the rear end side of the substrate 110 can be further suppressed.

As described above, the lamp 100 according to the present embodiment includes the substrate 110, the optical member 130, the heat-dissipation member 150 and the heat-transfer member 190. The heat-transfer member 190 is provided at a position located between the substrate 110 and the heat-dissipation member 150 and overlapping with at least the light source 111, as seen from the stacked direction A. The heat-dissipation member 150 and the optical member 130 are fixed to each other at one end sides thereof by the fixing mechanism 170. Further, the heat-dissipation member 150 and the optical member 130 are hooked and fixed at the other end sides thereof so as to be prevented from being displaced in a direction away from each other with the heat-transfer member 190 located between the one end side and the other end side being a support point and the one end side being a force point.

In this way, the deformation of the substrate 110 can be suppressed. Further, as a result, the positional deviation of the light source 111 mounted on the substrate 110 can be suppressed. When the light source 111 is deviated from the position where the light source 111 should be originally located with respect to the optical member 130, luminous intensity of a light distribution pattern projected on a road surface can be reduced and visibility of a driver can be lowered. Further, the projection position of the light distribution pattern is deviated, thereby leading to the glare of an oncoming vehicle or a pedestrian. For example, from the viewpoint of forming the light distribution pattern, the accuracy of the mounting position of the light source 111 to the substrate 110 is desirable to be equal to or less than 0.11 mm. Therefore, the positional deviation of the light source 111 due to the deformation of the substrate 110 is required to be equal to or less than 0.1 mm. On the contrary, according to the lamp 100 of the present embodiment, a decrease in the formation accuracy of the light distribution pattern due to the reduction of the luminous intensity and the deviation of the projection position can be suppressed. Furthermore, by suppressing the deformation of the substrate 110, the disconnection of a wiring pattern formed on the substrate 110 or an increase in load applied to the optical member 130 or the heat-dissipation member 150 or the like can be suppressed.

Further, in order to suppress the deformation of the substrate 110 when both the front end sides and the rear end sides of the optical member 130 and the heat-dissipation member 150 are fixed by the fixing mechanism 170, it is necessary to devise the arrangement of the fixing mechanism 170 or to strictly manage the fastening torque of the fastening member 172. On the contrary, in the present embodiment, the deformation of the substrate 110 is suppressed by the hooked fixation of the optical member 130 and the heat-dissipation member 150. As a result, a degree of freedom in design of the lamp 100 can be improved and a manufacturing process of the lamp 100 can be simplified.

Further, in the present embodiment, the hooked fixation of the optical member 130 and the heat-dissipation member 150 is realized by the claw portion 154 provided in the heat-dissipation member 150. Therefore, the deformation of the substrate 110 can be suppressed with a simple configuration. Further, as compared to the case where the front end side and rear end side are fixed by the fixing mechanism 170, the number of parts and the assembly man-hour can be reduced. Further, the claw portion 154 can be freely arranged since it does not hinder the progress of the light reflected in the reflective surface 132a, as compared to the boss portion 133.

Second Embodiment

A lamp 100 according to a second embodiment has the same configuration as the lamp 100 according to the first embodiment except that the heat-dissipation member 150 does not have the second portion 152 and the connection portion 153. Hereinafter, the configuration of the lamp 100 of the second embodiment different from the first embodiment is intensively described and the configuration common to both embodiments is simply described or is not described.

Figure 5:
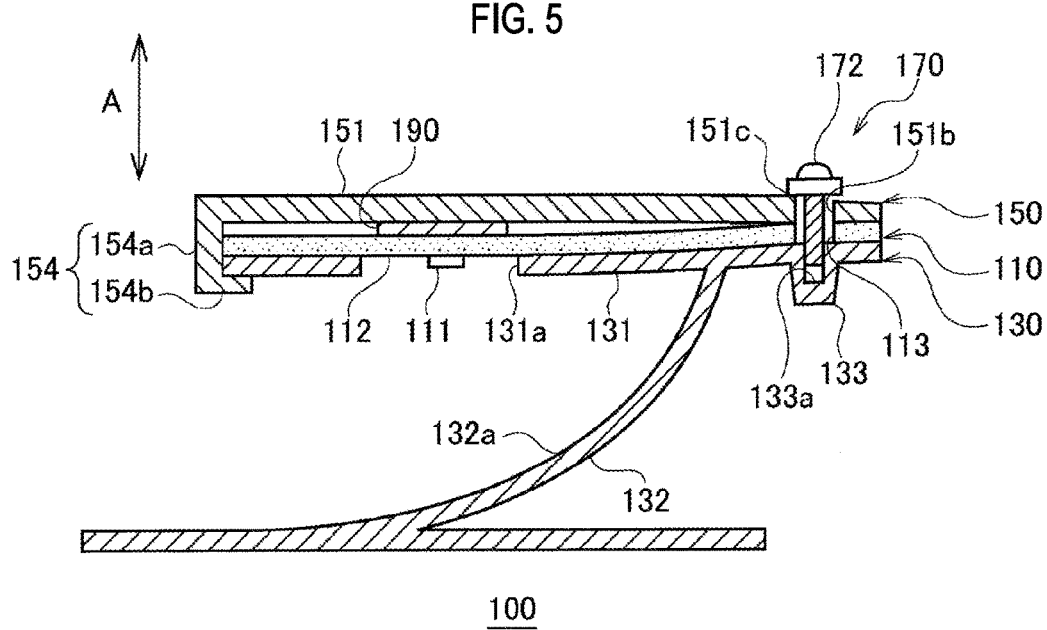
FIG. 5 is a sectional view schematically showing a lamp according to a second embodiment.

FIG. 5 is a sectional view schematically showing the lamp 100 according to the second embodiment. The lamp 100 (100B) according to the present embodiment includes a substrate 110 (110B), an optical member 130 (130B), a heat-dissipation member 150 (150B), a fixing mechanism 170 (170B) and a heat-transfer member 190. The optical member 130, the substrate 110 and the heat-dissipation member 150 are arranged in this order. The heat-transfer member 190 is disposed between the substrate 110 and the heat-dissipation member 150. The substrate 110, the optical member 130, the fixing mechanism 170 and the heat-transfer member 190 have the same structure as in the first embodiment.

The heat-dissipation member 150 has a first portion 151 and a claw portion 154. The first portion 151 has a flat plate shape and is in contact with the heat-transfer member 190 in a thermally conducting manner. The first portion 151 has an insertion hole 151b for the fastening member 172 and a fastening seat surface 151c disposed around the insertion hole 151b at a region overlapping with a boss portion 133 in the stacked direction A. The claw portion 154 has the same configuration as the first embodiment.

Also in the present embodiment, similar to the first embodiment, one end sides of the optical member 130 and the heat-dissipation member 150 are fixed by the fixing mechanism 170 and the other end sides thereof are fixed by the hooked fixation. With the hooked fixation, the optical member 130 and the heat-dissipation member 150 are prevented from being displaced in a direction in which the other end sides are spaced away from each other with the heat-transfer member 190 located between the one end side and the other end side being a support point and the one end side being a force point.

The heat-dissipation member 150 does not have the narrow portion T and the wide portion W. Therefore, the rear end side of the substrate 110 is deformed by the stress generated when the fastening member 172 is fastened.

However, since the front end side of the substrate 110 is fixed by the hooked fixation, at least the deformation of the front end side of the substrate 110 can be suppressed. Therefore, the lamp 100 according to the present embodiment can also suppress the deformation of the substrate 110, as compared to the case where the front end side and the rear end side are fixed by the fixing mechanism 170. Further, the other effects can be obtained in the same manner as in the first embodiment.

Third Embodiment

A lamp 100 according to a third embodiment has the same configuration as the lamp 100 according to the first embodiment except that a claw portion is provided in an optical member 130. Hereinafter, the configuration of the lamp 100 of the third embodiment different from the first embodiment is intensively described and the configuration common to both embodiments is simply described or is not described.

Figure 6:
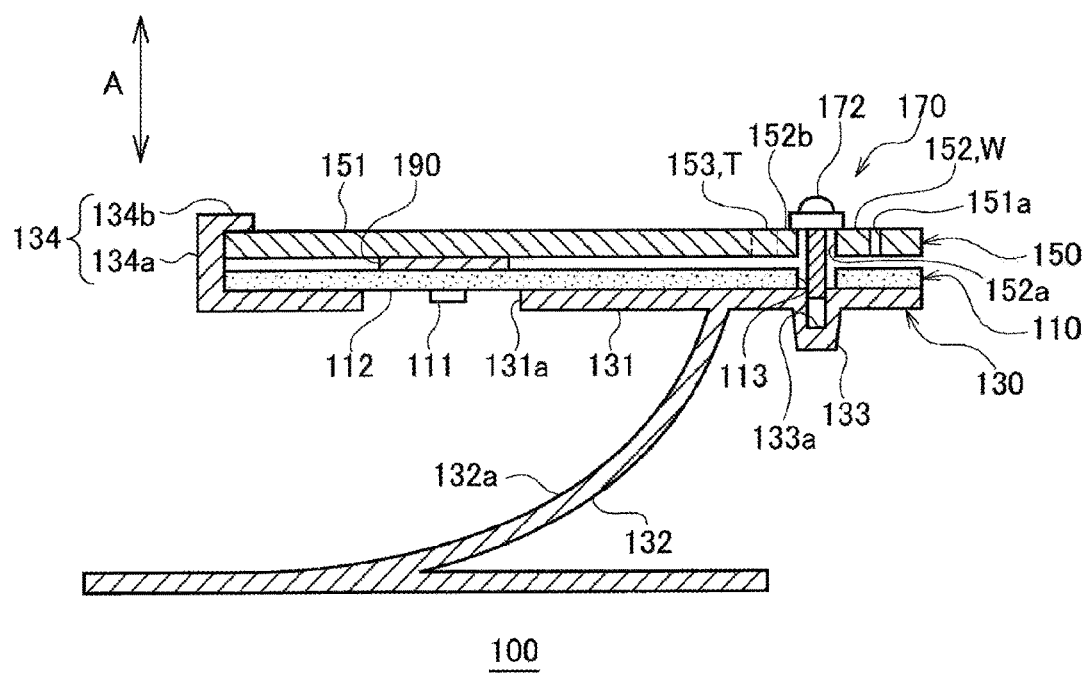
FIG. 6 is a sectional view schematically showing a lamp according to a third embodiment.

FIG. 6 is a sectional view schematically showing the lamp 100 according to the third embodiment. Meanwhile, FIG. 6 shows a state where a fastening member 172 is not fastened. The lamp 100 (100C) according to the present embodiment includes a substrate 110 (110C), an optical member 130 (130C), a heat-dissipation member 150 (150C), a fixing mechanism 170 (170C) and a heat-transfer member 190. The optical member 130, the substrate 110 and the heat-dissipation member 150 are arranged in this order. The heat-transfer member 190 is disposed between the substrate 110 and the heat-dissipation member 150. The substrate 110, the fixing mechanism 170 and the heat-transfer member 190 have the same structure as in the first embodiment.

The optical member 130 has a flat plate-shaped base portion 131 in contact with the substrate 110, a reflective portion 132 bent downward from the base portion 131 and extending toward the vehicle front, and a claw portion 134.

The base portion 131 has an opening 131a for a light source. The reflective portion 132 has a reflective surface 132a. The light source 111 is disposed inside the opening 131a for the light source, and a light emitting surface thereof substantially faces the reflective surface 132a. The base portion 131 is provided with a boss portion 133. The boss portion 133 is disposed in one end side of the optical member 130, in the present embodiment, in the rear end side thereof. The boss portion 133 has a fastening hole 133a into which the fastening member 172 is screwed.

The claw portion 134 is a portion which connects the optical member 130 and the heat-dissipation member 150 to each other by being hooked to an end of the heat-dissipation member 150. The claw portion 134 is disposed in the other end side of the optical member 130, in the present embodiment, in the front end side thereof. The light source 111 is disposed between the claw portion 134 and the boss portion 133 in the longitudinal direction of the lamp 100. The claw portion 134 is formed by, for example, causing the front end of the base portion 131 to be folded back.

The claw portion 134 has a vertical portion 134a extending substantially parallel to the stacked direction A and a parallel portion 134b extending parallel to the first portion 151 of the heat-dissipation member 150 from an upper end of the vertical portion 134a. The vertical portion 134a extends to the heat-dissipation member 150 side from the front end surface of the base portion 131 and the parallel portion 154b extends to the second portion 152 side from the upper end surface of the vertical portion 134a. Therefore, the claw portion 134 has a substantially L-shaped cross section. Further, the front end (portion including the front ends of the base portion 131 and the claw portion 134) of the optical member 130 has a substantially U-shaped cross section.

A front end of the first portion 151 is hooked by the claw portion 134, so that the optical member 130 and the heat-dissipation member 150 are hooked and fixed. When the optical member 130 and the heat-dissipation member 150 are hooked and fixed, the substrate 110 sandwiched therebetween is also fixed. In the state where the optical member 130 and the heat-dissipation member 150 are hooked and fixed, the end surface of the first portion 151 facing the lamp front side is in contact with the vertical portion 134a and the major surface of the first portion 151 opposite to the substrate 110 is in contact with the parallel portion 134b. Meanwhile, in the present embodiment, the front end surface of the substrate 110 is also in contact with the vertical portion 134a.

The heat-dissipation member 150 has the first portion 151, the second portion 152 and the connection portion 153. Further, the heat-dissipation member 150 has the narrow portion T and the wide portion W. The heat-dissipation member 150 has the same structure as in the first embodiment except for having no claw portion 154.

Also in the present embodiment, similar to the first embodiment, one end sides of the optical member 130 and the heat-dissipation member 150 are fixed by the fixing mechanism 170 and the other end sides thereof are fixed by the hooked fixation. With the hooked fixation, the optical member 130 and the heat-dissipation member 150 are prevented from being displaced in a direction in which the other end sides are spaced away from each other with the heat-transfer member 190 located between the one end side and the other end side being a support point and the one end side being a force point.

Therefore, also in the present embodiment, similar to the first embodiment, the deformation of the substrate 110 can be suppressed. That is, from the first embodiment and the present embodiment, it is appreciated that one of two members of the optical member 130 and the heat-dissipation member 150 has the claw portion 134, 154 by which the other member thereof is hooked, and hence, the deformation of the substrate 110 can be suppressed. Further, the other effects can be obtained in the same manner as in the first embodiment.

Fourth Embodiment

A lamp 100 according to a fourth embodiment has the same configuration as the lamp 100 according to the first embodiment except that the structure for the hooked fixation is different from each other. Hereinafter, the configuration of the lamp 100 of the fourth embodiment different from the first embodiment is intensively described and the configuration common to both embodiments is simply described or is not described.

Figure 7:
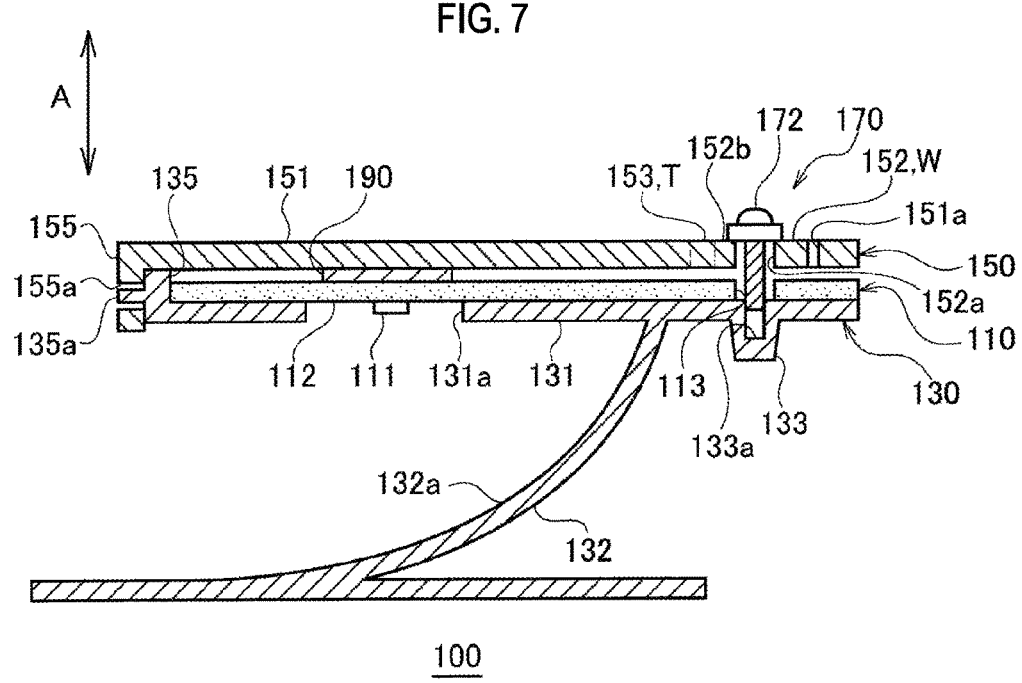
FIG. 7 is a sectional view schematically showing a lamp according to a fourth embodiment.

FIG. 7 is a sectional view schematically showing the lamp 100 according to the fourth embodiment. Meanwhile, FIG. 7 shows a state where a fastening member 172 is not fastened. The lamp 100 (100D) according to the present embodiment includes a substrate 110 (110D), an optical member 130 (130D), a heat-dissipation member 150 (150D), a fixing mechanism 170 (170D) and a heat-transfer member 190. The optical member 130, the substrate 110 and the heat-dissipation member 150 are arranged in this order. The heat-transfer member 190 is disposed between the substrate 110 and the heat-dissipation member 150. The substrate 110, the fixing mechanism 170 and the heat-transfer member 190 have the same structure as in the first embodiment.

The optical member 130 has a flat plate-shaped base portion 131 in contact with the substrate 110, a reflective portion 132 bent downward from the base portion 131 and extending toward the vehicle front, and a vertical portion 135.

The base portion 131 has an opening 131a for a light source. The reflective portion 132 has a reflective surface 132a. The light source 111 is disposed inside the opening 131a for the light source, and a light emitting surface thereof substantially faces the reflective surface 132a. The base portion 131 is provided with a boss portion 133. The boss portion 133 is disposed in one end side of the optical member 130, in the present embodiment, in the rear end side thereof. The boss portion 133 has a fastening hole 133a into which the fastening member 172 is screwed.

The vertical portion 135 is provided in the front end of the base portion 131 and extends substantially parallel to the stacked direction A. Specifically, the vertical portion 135 extends to the heat-dissipation member 150 side from the front end of the base portion 131. The vertical portion 135 is formed by bending the front end of the base portion 131, for example. The vertical portion 135 has, at a surface facing the lamp front side, a convex portion 135a protruding to the lamp front side.

The heat-dissipation member 150 has a first portion 151, a second portion 152, a connection portion 153 and a locking portion 155. Further, the heat-dissipation member 150 has a narrow portion T and a wide portion W. The heat-dissipation member 150 has the same structure as in the first embodiment except for having the locking portion 155.

The locking portion 155 is disposed in the front end side of the heat-dissipation member 150. The light source 111 is disposed between the locking portion 155 and the second portion 152 in the longitudinal direction of the lamp 100. The claw portion 134 is formed by, for example, causing the front end of the base portion 131 to be folded back. The locking portion 155 extends substantially parallel to the stacked direction A, in other words, in a direction intersecting with an extending direction of the first portion 151 or the substrate 110. Specifically, the locking portion 155 extends to the optical member 130 side from the front end of the first portion 151. Further, the locking portion 155 has an opening 155a penetrating in the longitudinal direction of the lamp. For example, the locking portion 155 is formed in such a way that a drilling is performed on the formation position of the opening 155a in the front end of the first portion 151, and then, the front end is bent.

The front end of the optical member 130 is inserted through the opening 155a, so that the optical member 130 is hooked and fixed to the heat-dissipation member 150. In the present embodiment, the convex portion 135a is inserted through the opening 155a, so that the optical member 130 and the heat-dissipation member 150 are hooked and fixed to each other. When the optical member 130 and the heat-dissipation member 150 are hooked and fixed to each other, the substrate 110 sandwiched therebetween is also fixed. In the state where the optical member 130 and the heat-dissipation member 150 are hooked and fixed, the surface of the locking portion 155 facing the lamp rear side and the surface of the vertical portion 135 facing the lamp front side are in contact with each other. A front end surface of the substrate 110 is in contact with the surface of the vertical portion 135 facing the lamp rear side.

Also in the present embodiment, similar to the first embodiment, one end sides of the optical member 130 and the heat-dissipation member 150 are fixed by the fixing mechanism 170 and the other end sides thereof are fixed by the hooked fixation. With the hooked fixation, the optical member 130 and the heat-dissipation member 150 are prevented from being displaced in a direction in which the other end sides are spaced away from each other with the heat-transfer member 190 located between the one end side and the other end side being a support point and the one end side being a force point.

Therefore, also in the present embodiment, similar to the first embodiment, the deformation of the substrate 110 can be suppressed. Further, the other effects can be obtained in the same manner as in the first embodiment. Meanwhile, in the present embodiment, the heat-dissipation member 150 has the locking portion 155 and an end of the optical member 130 is inserted through the opening 155a. However, the optical member 130 may have the locking portion 155 and an end of the heat-dissipation member 150 may be inserted through the opening 155a. That is, one of two members of the heat-dissipation member 150 and the optical member 130 can include the locking portion 155 having the opening 155a and an end of the other member can be hooked and fixed by being inserted through the opening 155a, thereby suppressing the deformation of the substrate 110.

Further, in the present embodiment, the vertical portion 135 is located on the lamp rear side of the locking portion 155. However, the present invention is not particularly limited to this configuration. For example, the vertical portion 135 may be located on the lamp front side of the locking portion 155 and the convex portion 135a may protrude to the lamp rear side. In this case, the convex portion 135a is inserted through the opening 155a of the locking portion 155 from the lamp front side. Also in the case where the locking portion 155 is provided in the optical member 130, the longitudinal positions of the locking portion 155 and the vertical portion 135 can be replaced with each other.

Fifth Embodiment

A lamp 100 according to a fifth embodiment has the same configuration as the lamp 100 according to the first embodiment except that the structure of a fixing mechanism 170 is different from each other. Hereinafter, the configuration of the lamp 100 of the fifth embodiment different from the first embodiment is intensively described and the configuration common to both embodiments is simply described or is not described.

Figure 8:
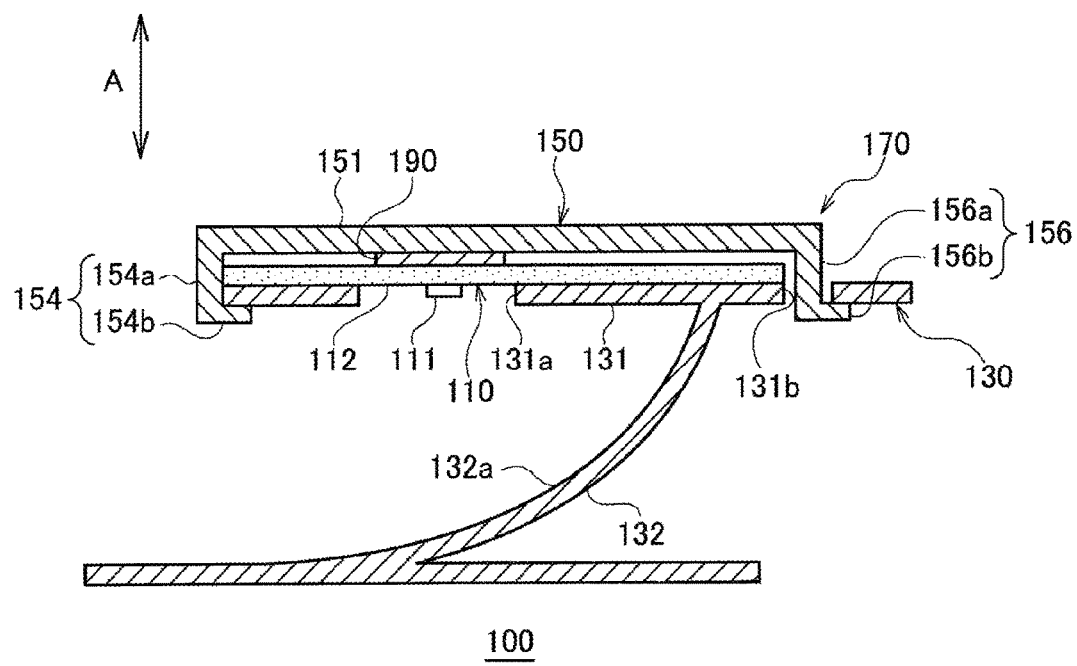
FIG. 8 is a sectional view schematically showing a lamp according to a fifth embodiment.

FIG. 8 is a sectional view schematically showing the lamp 100 according to the fifth embodiment. The lamp 100 (100E) according to the present embodiment includes a substrate 110 (110E), an optical member 130 (130E), a heat-dissipation member 150 (150E), a fixing mechanism 170 (170E) and a heat-transfer member 190. The optical member 130, the substrate 110 and the heat-dissipation member 150 are arranged in this order. The heat-transfer member 190 is disposed between the substrate 110 and the heat-dissipation member 150. The heat-transfer member 190 has the same structure as in the first embodiment.

The substrate 110 has a light source mounting surface 112. A light source 111 is mounted on the light source mounting surface 112.

The optical member 130 has a flat plate-shaped base portion 131 in contact with the substrate 110 and a reflective portion 132 bent downward from the base portion 131 and extending toward the vehicle front. The base portion 131 has an opening 131a for the light source. The reflective portion 132 has a reflective surface 132a. The light source 111 is disposed in the opening 131a for the light source and a light emitting surface thereof is substantially opposite to the reflective surface 132a. A lance-engagement opening 131b is provided in the base portion 131. The opening 131b is disposed in one end side of the optical member 130, in the present embodiment, in the rear end side thereof.

The heat-dissipation member 150 has a first portion 151, a claw portion 154 and a lance-engagement hook 156. The first portion 151 has a flat plate shape and is in contact with the heat-transfer member 190 in a thermally conducting manner. The claw portion 154 is provided at the front end of the first portion 151. The claw portion 154 has the same structure as in the first embodiment.

The lance-engagement hook 156 has a leg portion 156a extending to the optical member 130 side from a rear end surface of the first portion 151, and a protruding portion 156b protruding to the lamp rear side from a surface of the leg portion 156a facing the lamp rear side. The heat-dissipation member 150 is configured such that the lance-engagement hook 156 is inserted through the opening 131b in the state where the claw portion 154 is hooked to the front end of the optical member 130. In this way, the protruding portion 156b is hooked to an edge of the opening 131b, so that the optical member 130 and the heat-dissipation member 150 are lance-engaged at the rear end sides thereof. Therefore, in the present embodiment, the fixing mechanism 170 is configured by the lance-engagement hook 156.

Also in the present embodiment, similar to the first embodiment, one end sides of the optical member 130 and the heat-dissipation member 150 is fixed by the fixing mechanism 170 and the other end sides thereof are fixed by a hooked fixation. With the hooked fixation, the optical member 130 and the heat-dissipation member 150 are prevented from being displaced in a direction in which the other end sides are spaced away from each other with the heat-transfer member 190 located between the one end side and the other end side being a support point and the one end side being a force point.

Therefore, also in the present embodiment, similar to the first embodiment, the deformation of the substrate 110 can be suppressed. Further, the other effects can be obtained in the same manner as in the first embodiment. Furthermore, in the present embodiment, the fixing mechanism 170 is configured by the lance-engagement hook 156. Therefore, also in the rear end side of the optical member 130 and the heat-dissipation member 150, the distance between the substrate 110 and the heat-dissipation member 150 to approach each other by the fixing can be more reliably reduced, as compared to the case where the optical member 130 and the heat-dissipation member 150 are fixed by the fastening member 172. As a result, the deformation of the substrate 110 can be further suppressed. Further, the number of parts and the assembly man-hour can be further reduced.

Meanwhile, in the present embodiment, the heat-dissipation member 150 has the lance-engagement hook 156 and the optical member 130 has the opening 131b. However, the optical member 130 may have the lance-engagement hook 156 and the heat-dissipation member 150 may have the opening 131b. Further, an opening may be provided in the rear end side of the substrate 110 and the lance-engagement hook 156 may be inserted through the opening.

Sixth Embodiment

A lamp 100 according to a sixth embodiment has the same configuration as the lamp 100 according to the first embodiment except that the structure of a claw portion 154 and a fixing mechanism 170 is different from each other. Hereinafter, the configuration of the lamp 100 of the sixth embodiment different from the first embodiment is intensively described and the configuration common to both embodiments is simply described or is not described.

FIG. 9 is a sectional view schematically showing the lamp 100 according to the sixth embodiment. Meanwhile, FIG. 9 shows a state before an optical member 130, a substrate 110 and heat-dissipation member 150 are not fastened by a clip 174. The lamp 100 (100F) according to the present embodiment includes the substrate 110 (110F), the optical member 130 (130F), the heat-dissipation member 150 (150F), a fixing mechanism 170 (170F) and a heat-transfer member 190. The optical member 130, the substrate 110 and the heat-dissipation member 150 are arranged in this order. The heat-transfer member 190 is disposed between the substrate 110 and the heat-dissipation member 150. The heat-transfer member 190 has the same structure as in the first embodiment.

The substrate 110 has a light source mounting surface 112. A light source 111 is mounted on the light source mounting surface 112. Further, an opening 114 is provided in the front end side of the substrate 110.

The optical member 130 has a flat plate-shaped base portion 131 in contact with the substrate 110 and a reflective portion 132 bent downward from the base portion 131 and extending toward the vehicle front. The base portion 131 has an opening 131a for the light source. The reflective portion 132 has a reflective surface 132a. The light source 111 is disposed in the opening 131a for the light source and a light emitting surface thereof is substantially opposite to the reflective surface 132a.

An opening 131c is provided in the front end side of the base portion 131. The opening 131c is provided at a position overlapping with the opening 114 in the stacked direction A in the state where the optical member 130, the substrate 110 and the heat-dissipation member 150 are fixed. A clip-engaged rib 136 is provided in the rear end side of the base portion 131. The rib 136 protrudes to the side opposite to the substrate 110 in the stacked direction A.

The heat-dissipation member 150 has a first portion 151 and a claw portion 154. The first portion 151 has a flat plate shape and is in contact with the heat-transfer member 190 in a thermally conducting manner. An opening 157 is provided in the rear end side of the first portion 151. The clip 174 (to be described later) is engaged with the opening 157. The claw portion 154 is provided at a front end of the first portion 151. The claw portion 154 has a second vertical portion 154c extending substantially parallel to the stacked direction from a leading end of a parallel portion 154b, in addition to a vertical portion 154a and the parallel portion 154b. The second vertical portion 154c extends to the substrate 110 side from a rear end surface of the parallel portion 154b.

As the claw portion 154 is hooked to the front end of the optical member 130, the second vertical portion 154c is inserted through the opening 131c of the optical member 130 and the opening 114 of the substrate 110. In this way, the optical member 130, the substrate 110 and the heat-dissipation member 150 can be more firmly fixed.

The fixing mechanism 170 has the clip 174. The clip 174 is, for example, an annular or cylindrical elastic member and has a discontinuous portion in a circumferential direction. The clip 174 is displaced in such a way that one end 174a and the other end 174b of the discontinuous portion are spaced away from each other. Further, the one end 174a is inserted into the opening 157 and the other end 174b is hooked to the clip-engaged rib 136. The clip 174 fixes the optical member 130, the substrate 110 and the heat-dissipation member 150 by a reaction force against the force of the optical member 130, the substrate 110 and the heat-dissipation member 150 pressing the one end 174a and the other end 174b in a direction away from each other.

Also in the present embodiment, similar to the first embodiment, one end sides of the optical member 130 and the heat-dissipation member 150 are fixed by the fixing mechanism 170 and the other end sides thereof are fixed by a hooked fixation. With the hooked fixation, the optical member 130 and the heat-dissipation member 150 are prevented from being displaced in a direction in which the other end sides are spaced away from each other with the heat-transfer member 190 located between the one end side and the other end side being a support point and the one end side being a force point. Therefore, also in the present embodiment, similar to the first embodiment, the deformation of the substrate 110 can be suppressed. Further, the other effects can be obtained in the same manner as in the first embodiment.

Seventh Embodiment

A lamp 100 according to a seventh embodiment has the same configuration as the lamp 100 according to the first embodiment except that a boss portion 133 of an optical member 130 protrudes to a substrate 110 side. Hereinafter, the configuration of the lamp 100 of the seventh embodiment different from the first embodiment is intensively described and the configuration common to both embodiments is simply described or is not described.

FIG. 10 is a sectional view schematically showing the lamp 100 according to the seventh embodiment. Meanwhile, FIG. 10 shows a state where a fastening member 172 is not fastened. The lamp 100 (100G) according to the present embodiment includes the substrate 110 (110G), the optical member 130 (130G), a heat-dissipation member 150 (150G), a fixing mechanism 170 (170G) and a heat-transfer member 190. The optical member 130, the substrate 110 and the heat-dissipation member 150 are arranged in this order. The heat-transfer member 190 is disposed between the substrate 110 and the heat-dissipation member 150. The heat-transfer member 190 has the same structure as in the first embodiment.

The substrate 110 has a light source mounting surface 112. A light source 111 is mounted on the light source mounting surface 112. Further, the substrate 110 has an opening 115 at a region overlapping with the boss portion 133 in the stacked direction A.

The optical member 130 has a flat plate-shaped base portion 131 in contact with the substrate 110 and a reflective portion 132 bent downward from the base portion 131 and extending toward the vehicle front. The base portion 131 has an opening 131a for the light source. The reflective portion 132 has a reflective surface 132a. The light source 111 is disposed in the opening 131a for the light source and a light emitting surface thereof is substantially opposite to the reflective surface 132a.

Further, the base portion 131 has the boss portion 133. In the present embodiment, the boss portion 133 protrudes to the substrate 110 side. Further, the boss portion 133 is disposed on the lamp front side of a connection portion between the base portion 131 and the reflective portion 132, for example. Since the boss portion 133 protrudes to the substrate 110 side, even in such arrangement, it is possible to avoid that the travelling of the light from the light source toward the lamp front is hindered by the boss portion 133. As a result, when the boss portion 133 protrudes to the substrate 110 side, a degree of freedom in installation of the boss portion 133 can be increased, and furthermore, a degree of freedom in design of the lamp 100 can be increased. The boss portion 133 has a fastening hole 133a for the fastening member 172.

The heat-dissipation member 150 has a first portion 151, a second portion 152, a connection portion 153 and a claw portion 154. The first portion 151 has a flat plate shape and is in contact with the heat-transfer member 190 in a thermally conducting manner. Further, the first portion 151 has an opening 115d at a region overlapping with the boss portion 133 in the stacked direction A.

The second portion 152 is disposed at a position overlapping with the opening 151d in the stacked direction A. Further, the second portion 152 is spaced apart from the optical member 130 than the first portion 151. The second portion 152 has an insertion hole 152a and a fastening seat surface 152b. The second portion 152 extends parallel to the first portion 151, for example.

The connection portion 153 connects the first portion 151 and the second portion 152. One end side of the connection portion 153 is connected to the first portion 151. Further, the connection portion 153 extends vertically upward from the first portion 151 or extends in a direction away from the substrate 110 or the optical member 130. The other end side of the connection portion is connected to the second portion 152.

The claw portion 154 has the same structure as in the first embodiment. Further, similar to the first embodiment, the heat-dissipation member 150 has a narrow portion T and a wide portion W. Therefore, the heat-dissipation member 150 has a portion where two side surfaces are close to each other or are spaced away from each other in a stepwise manner or a continuous manner, similar to the first embodiment. The heat-dissipation member 150 can be manufactured as follows. First, a cut-out along the shape of the second portion 152 and the connection portion 153 is provided at a predetermined position of, for example, an aluminum plate. Then, the portion inside the cut-out is cut and raised to form the second portion 152 and the connection portion 153. Then, the front end of the aluminum plate is folded back to form the claw portion 154.

The substrate 110 is aligned with the optical member 130 such that the opening 115 overlaps with the boss portion 133. The substrate 110 is stacked on the base portion 131. In this way, the boss portion 133 is inserted through the opening 115. The heat-dissipation member 150 is configured in such a way that the claw portion 154 is hooked to the front end of the optical member 130, and then, the boss portion 133 is inserted through the opening 151d. In this way, the fastening hole 133a of the boss portion 133 and the insertion hole 152a of the second portion 152 are overlapped in the stacked direction A. Then, the fastening member 172 is inserted through the insertion hole 152a and fastened to the fastening hole 133a. A head portion of the fastening member 172 is in contact with the fastening seat surface 152b. In this way, the substrate 110, the optical member 130 and the heat-dissipation member 150 can be fixed to each other.

Also in the present embodiment, similar to the first embodiment, one end sides of the optical member 130 and the heat-dissipation member 150 are fixed by the fixing mechanism 170 and the other end sides thereof are fixed by a hooked fixation. With the hooked fixation, the optical member 130 and the heat-dissipation member 150 are prevented from being displaced in a direction in which the other end sides are spaced away from each other with the heat-transfer member 190 located between the one end side and the other end side being a support point and the one end side being a force point. Therefore, also in the present embodiment, similar to the first embodiment, the deformation of the substrate 110 can be suppressed. Further, the other effects can be obtained in the same manner as in the first embodiment.

Furthermore, in the present embodiment, the boss portion 133 protrudes to the heat-dissipation member 150 side. Therefore, it is possible to avoid that the boss portion 133 is overlapped with an optical path of the light from the light source. As a result, a degree of freedom in design of the lamp 100 can be increased and the luminous intensity of the lamp 100 can be increased.

Eight Embodiment

A lamp 100 according to an eighth embodiment has substantially the same configuration as the lamp 100 according to the first embodiment except that a substrate 110 and a heat-dissipation member 150 are hooked and fixed and a locking portion 155 is utilized as a structure for the hooked fixation. Hereinafter, the configuration of the lamp 100 of the eighth embodiment different from the first embodiment is intensively described and the configuration common to both embodiments is simply described or is not described.

FIG. 11A is a sectional view schematically showing the lamp 100 according to the eighth embodiment and FIG. 11B is a plan view schematically showing a heat-dissipation member 150 included in the lamp 100 according to the eighth embodiment. Meanwhile, FIG. 11A corresponds to a sectional view of the lamp 100 taken along a line B-B shown in FIG. 11B. Further, FIG. 11A shows a state where a fastening member 172 and a second fastening member 175 are not fastened.

The lamp 100 (100H) according to the present embodiment includes the substrate 110 (110H), an optical member 130 (130H), the heat-dissipation member 150 (150H), a fixing mechanism 170 (170H) and a heat-transfer member 190. The optical member 130, the substrate 110 and the heat-dissipation member 150 are arranged in this order. The heat-transfer member 190 is disposed between the substrate 110 and the heat-dissipation member 150. The heat-transfer member 190 has the same structure as in the first embodiment.

The substrate 110 has a light source mounting surface 112. A light source 111 is mounted on the light source mounting surface 112. The substrate 110 has, at a predetermined position, an opening 116 into which a positioning convex portion 137 (to be described later) is fitted. Further, the substrate 110 has, at the rear end side, an insertion hole 117 through which the fastening member 172 is inserted. In addition, the substrate 110 has, at the rear end side, an insertion hole 118 through which the second fastening member 175 is inserted. The insertion hole 118 is located at the rear end side of the insertion hole 117.

The optical member 130 has a flat plate-shaped base portion 131 in contact with the substrate 110 and a reflective portion 132 bent downward from the base portion 131 and extending toward the vehicle front. The base portion 131 has an opening 131a for the light source. The reflective portion 132 has a reflective surface 132a. The light source 111 is disposed in the opening 131a for the light source and a light emitting surface thereof is substantially opposite to the reflective surface 132a.

Further, the base portion 131 has a boss portion 133 at a position overlapping with the insertion hole 118 in the stacked direction A. The boss portion 133 has a fastening hole 133a into which the second fastening member 175 is screwed. Further, the base portion 131 has the positioning convex portion 137 at a position overlapping with the opening 116 of the substrate 110 in the stacked direction A. The positioning convex portion 137 protrudes to the substrate 110 side. Further, the base portion 131 has a concave portion 138 on a surface in contact with the substrate 110. A head portion of the fastening member 172 is accommodated in the concave portion 138.

The heat-dissipation member 150 has a first portion 151, a second portion 152, a connection portion 153 and a locking portion 155. The first portion 151 has a flat plate shape and is in contact with the heat-transfer member 190 in a thermally conducting manner. The first portion 151 has an opening 151a in a region overlapping with the insertion hole 117 of the substrate 110 in the stacked direction A. Further, the first portion 151 has an insertion hole 151e in a region overlapping with the boss portion 133 in the stacked direction A.

The second portion 152 is disposed at a position overlapping with the opening 151a in the stacked direction A. The second portion 152 has a fastening hole 152c for the fastening member 172. The second portion 152 is formed by performing, for example, a buffing process on an aluminum plate. Therefore, the second portion 152 has, around the fastening hole 152c, a portion standing on the side opposite to the substrate 110.

The connection portion 153 connects the first portion 151 and the second portion 152. The second portion 152 is connected to the first portion 151 through the connection portion 153. Therefore, the first portion 151 and the second portion 152 are spaced apart from each other at the region excluding the portion to which the connection portion 153 is connected. The locking portion 155 has the same structure as in the fourth embodiment. Further, the heat-dissipation member 150 has a narrow portion T and a wide portion W, similar to the first embodiment.

The fixing mechanism 170 has the fastening member 172 and the second fastening member 175. The fastening member 172 and the second fastening member 175 are, for example, screws.

The front end of the substrate 110 is inserted through the opening 155a of the locking portion 155, so that the substrate 110 is hooked and fixed to the heat-dissipation member 150. In the state where the front ends of the substrate 110 and the heat-dissipation member 150 are hooked and fixed, the fastening member 172 is inserted through the insertion hole 117 of the substrate 110 and fastened to the fastening hole 152c of the second portion 152. A head portion of the fastening member 172 is in contact with the surface of the substrate 110 on the side opposite to the heat-dissipation member 150. In this way, the rear end side of the substrate 110 and the heat-dissipation member 150 is fixed. In the state where the substrate 110 and the heat-dissipation member 150 is fixed, the insertion hole 118 of the substrate 110 and the insertion hole 151e of the heat-dissipation member 150 are overlapped with each other in the stacked direction A.

A stacked body of the substrate 110 and the heat-dissipation member 150 is placed on the base portion 131 of the optical member 130. Then, the positioning convex portion 137 of the optical member 130 is inserted into the opening 116 of the substrate 110, and hence, the substrate 110, the optical member 130 and the heat-dissipation member 150 are positioned. The head portion of the fastening member 172 is accommodated in the concave portion 138. With this positioning, the boss portion 133 and the insertion holes 118, 151e are overlapped in the stacked direction A. In this state, the second fastening member 175 is inserted through the insertion hole 151e and the insertion hole 118 and fastened to the fastening hole 133a. A head portion of the second fastening member 175 is in contact with the surface of the first portion 151 on the side opposite to the substrate 110. In this way, the substrate 110, the optical member 130 and the heat-dissipation member 150 can be fixed to each other.

In the present embodiment, one end sides of two members of the heat-dissipation member 150 and the substrate 110 are fixed to each other by the fixing mechanism 170. Further, the other end sides thereof are hooked and fixed such that the two members are prevented from being displaced in a direction away from each other with the heat-transfer member 190 located between the one end side and the other end side being a support point and the one end side being a force point. In this way, similar to the first embodiment, the deformation of the substrate 110 can be suppressed. Further, the other effects can be obtained in the same manner as in the first embodiment. Meanwhile, in the present embodiment, the heat-dissipation member 150 has the locking portion 155 and an end portion of the substrate 110 is inserted through the opening 155a. However, the substrate 110 may have the locking portion 155 and an end portion of the heat-dissipation member 150 may be inserted through the opening 155a.

Ninth Embodiment

A lamp 100 according to a ninth embodiment has the same configuration as the lamp 100 according to the eighth embodiment except that a heat-dissipation member 150 has a claw portion 154, in place of the locking portion 155. Hereinafter, the configuration of the lamp 100 of the ninth embodiment different from the eighth embodiment is intensively described and the configuration common to both embodiments is simply described or is not described.

Figure 12:
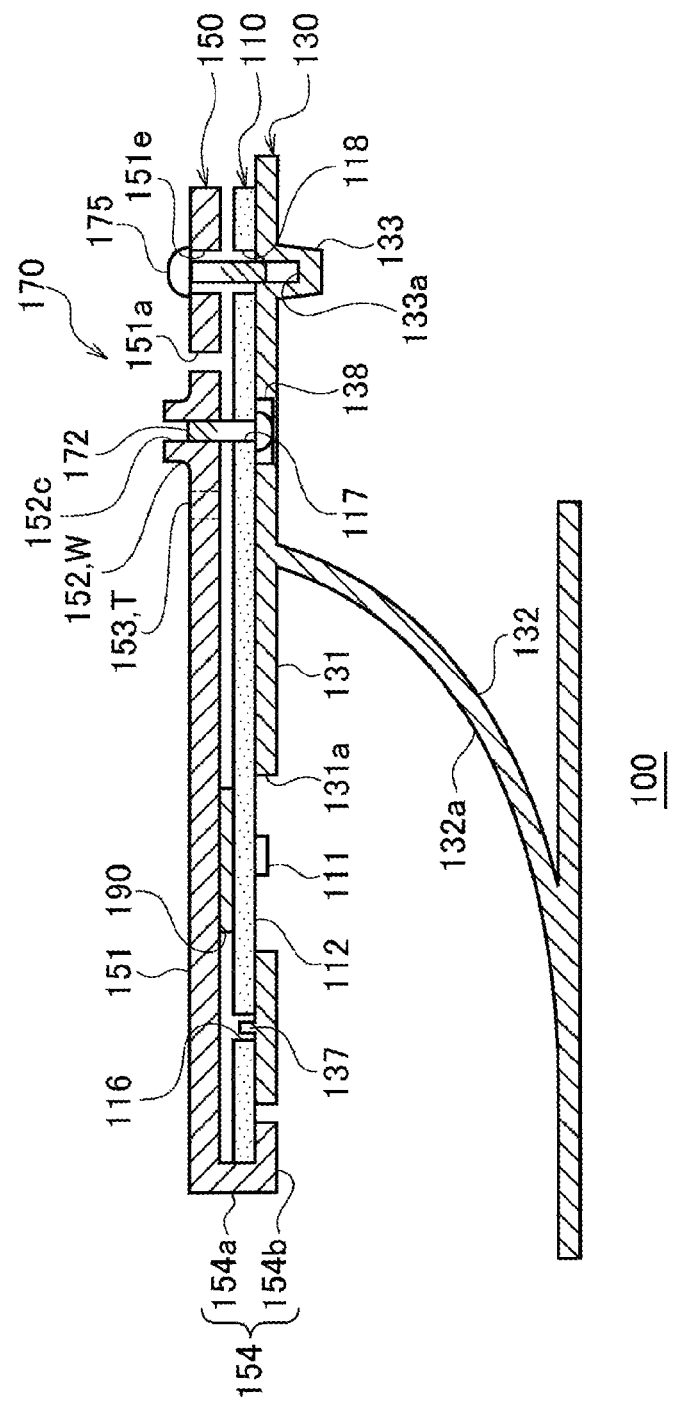
FIG. 12 is a sectional view schematically showing a lamp according to a ninth embodiment.

FIG. 12 is a sectional view schematically showing the lamp 100 according to the ninth embodiment. Meanwhile, FIG. 12 shows a state where a fastening member 172 and a second fastening member 175 are not fastened. The lamp 100 (100I) according to the present embodiment includes a substrate 110 (110I) an optical member 130 (130I) the heat-dissipation member 150 (150I) a fixing mechanism 170 (170I) and a heat-transfer member 190. The optical member 130, the substrate 110 and the heat-dissipation member 150 are arranged in this order. The heat-transfer member 190 is disposed between the substrate 110 and the heat-dissipation member 150. The substrate 110, the optical member 130 and the heat-transfer member 190 have the same structure as in the eighth embodiment.

The heat-dissipation member 150 has a first portion 151, a second portion 152, a connection portion 153 and the claw portion 154. The first portion 151, the second portion 152 and the connection portion 153 have the same structure as in the eighth embodiment. The claw portion 154 has the same structure as in the first embodiment. In the present embodiment, a front end of the substrate 110 is hooked by the claw portion 154, and hence, the substrate 110 and the heat-dissipation member 150 are hooked and fixed. In the state where the substrate 110 and the heat-dissipation member 150 are hooked and fixed, an end surface of the substrate 110 facing the lamp front side is in contact with a vertical portion 154a and a major surface of the substrate 110 on the side opposite to the heat-dissipation member 150 is in contact with a parallel portion 154b.

Also in the present embodiment, similar to the eighth embodiment, one end sides of the substrate 110 and the heat-dissipation member 150 are fixed by the fixing mechanism 170 and the other end sides thereof are fixed by the hooked fixation. With the hooked fixation, the substrate 110 and the heat-dissipation member 150 are prevented from being displaced in a direction in which the other end sides are spaced away from each other with the heat-transfer member 190 located between the one end side and the other end side being a support point and the one end side being a force point. Therefore, also in the present embodiment, similar to the eighth embodiment, the deformation of the substrate 110 can be suppressed. Further, the other effects can be obtained in the same manner as in the eighth embodiment.

Tenth Embodiment

Figure 13A:
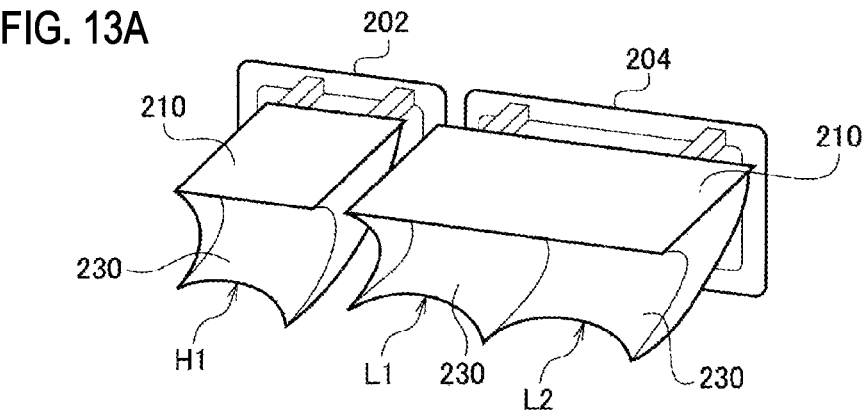
FIG. 13A is a perspective view schematically showing a lamp according to a tenth embodiment.
Figures 13B, 13C:
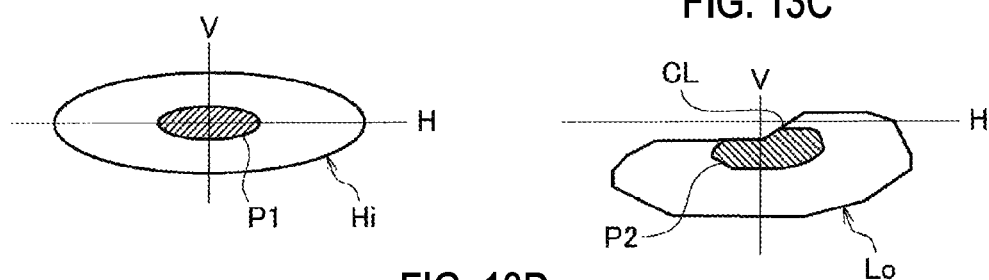
FIGS. 13B, 13C and 13E are schematic views showing an example of a light distribution pattern formed by the lamp according to the tenth embodiment.
Figure 13D:
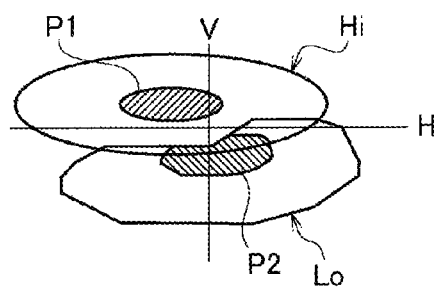
FIG. 13D is a schematic view showing an example of a light distribution pattern formed by a lamp according to a comparative example.
Figure 13E:
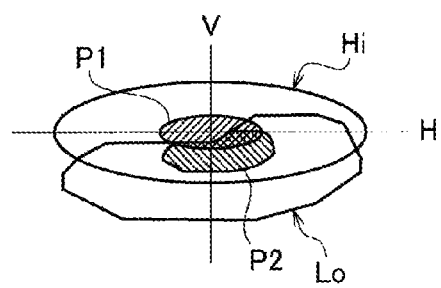

FIG. 13A is a perspective view schematically showing a lamp according to a tenth embodiment, FIGS. 13B, 13C and 13E are schematic views showing an example of a light distribution pattern formed by the lamp according to the tenth embodiment, and FIG. 13D is a schematic view showing an example of a light distribution pattern formed by a lamp according to a comparative example. FIGS. 13B to 13E show a light distribution pattern which is formed on a virtual vertical screen disposed at a position of 25 m in front of the lamp.

A lamp 200 according to the present embodiment is mounted on a vehicle headlamp device, for example. The vehicle headlamp device has a pair of headlamp units disposed on the left and right sides of the vehicle front. Since the pair of headlamp units has substantially the same configuration except for having a bilaterally symmetrical structure, a structure of the lamp 200 mounted on one of the pair of headlamp units will be described herein.

The lamp 200 is disposed in the lamp chamber 13 which is defined by the lamp body 11 and the outer cover (see FIG. 1). The lamp 200 includes a high-beam chamber H1, a first low-beam chamber L1 and a second low-beam chamber L2. Each chamber includes a substrate 210 having a light source mounted thereon and a reflector as an optical member 230. Further, similar to the first to ninth embodiments described above, the lamp may include the heat-dissipation member, the fixing mechanism and the heat-transfer member or the like. Furthermore, the lamp may have the same hooked fixation structure as in the first to ninth embodiments described above.

The high-beam chamber H1, and the first low-beam chamber L1 and the second low-beam chamber L2 are separately formed. The first low-beam chamber L1 and the second low-beam chamber L2 are integrally formed. The high-beam chamber H1 is supported on the lamp body 11 via a high-beam aiming bracket 202. The first low-beam chamber L1 and the second low-beam chamber L2 are supported on the lamp body 11 via a low-beam aiming bracket 204. Therefore, each of the high-beam chamber H1, and the first low-beam chamber L1 and the second low-beam chamber L2 can be configured in such a way that an angle of an optical axis is independently adjusted.

The high-beam chamber H1 can form a high-beam light distribution pattern Hi shown in FIG. 13B. The first low-beam chamber L1 and the second low-beam chamber L2 can form a low-beam light distribution pattern Lo shown in FIG. 13C. As an example, the first low-beam chamber L1 forms the portion the low-beam light distribution pattern Lo which includes a cut-off line CL having a predetermined shape (e.g., a so-called obliquely cut shape or a step cut shape, etc.). Further, the second low-beam chamber L2 forms the portion of the low-beam light distribution pattern Lo which does not include the cut-off line CL, for example, a diffusion region which is located below the low-beam light distribution pattern Lo and is spread in a horizontal direction. The light distribution pattern formed by the first low-beam chamber L1 and the light distribution pattern formed by the second low-beam chamber L2 are overlapped with each other to form the low-beam light distribution pattern Lo.

The high-beam light distribution pattern Hi includes a light-condensing pattern portion P1 which has luminous intensity higher than other regions. The low-beam light distribution pattern Lo includes a light-condensing pattern portion P2 which has luminous intensity higher than other regions. The light-condensing pattern portions P1, P2 irradiate the peripheries of H-V point that is an intersection of a vertical line V and a horizontal line H, thereby forming a so-called hot zone. The light-condensing pattern portion P2 is mainly formed by the first low-beam chamber L1. Since the shape of the high-beam light distribution pattern Hi and the low-beam light distribution pattern is well known, a detailed description thereof is omitted.

Typically, the lamp is designed such that both of the light-condensing pattern portions P1, P2 irradiate the peripheries of the H-V point. However, there is a possibility that the formation position of the light-condensing pattern portions P1, P2 is deviated due to the deformation of the reflector or other manufacturing requirements, etc. On the other hand, when the high-beam chamber H1 and the first low-beam chamber L1 are integrally formed, an optical axis of the high-beam chamber H1 and an optical axis of the first low-beam chamber L1 cannot be independently adjusted. Therefore, when the positional deviation of the light-condensing pattern portions P1, P2 occurs, at least one of the light-condensing pattern portion P1 and the light-condensing pattern portion P2 may be deviated from the peripheries of the H-V point, as shown in FIG. 13D. In FIG. 13D, the light-condensing pattern portion P1 is deviated from a position where the light-condensing pattern portion P1 should be originally formed.

On the contrary, in the lamp 200 according to the present embodiment, the high-beam chamber H1 and the low-beam chamber L1 are separately formed, and hence, optical axes thereof can be independently adjusted. Therefore, even when the positional deviation of the light-condensing pattern portions P1, P2 occurs, both of the light-condensing pattern portion P1 and the light-condensing pattern portion P2 can be located in the peripheries of the H-V point, as shown in FIG. 13E. In this way, the intensity of illumination of the hot zone can be more reliably increased, and thus, the distant visibility of a driver can be improved.

Meanwhile, the optical axis of at least one of the high-beam chamber H1 and the first low-beam chamber L1 may be adjusted. That is, the relative position between the optical axes of both chambers may be changed. Therefore, the optical axes of both of the high-beam chamber H1 and the first low-beam chamber L1 may be adjusted or the optical axis of only one of the high-beam chamber H1 and the first low-beam chamber L1 may be adjusted. Further, a configuration capable of independently performing the optical axis adjustment of the high-beam chamber H1 and the optical axis adjustment of the first low-beam chamber L1 is not limited to the configuration described above. For example, the optical axis adjustment may be independently realized in such a way that all of the chambers are mounted on a common aiming bracket and the high-beam chamber H1 or the first low-beam chamber L1 is mounted on an aiming bracket via any posture displacement mechanism.

Further, the number of the high-beam chamber and the low-beam chamber is not particularly limited. The number of the high-beam chamber may be two or more. The number of the low-beam chamber may be one or three or more. When a plurality of high-beam chambers H1 and a plurality of low-beam chambers L1 are provided, at least one high-beam chamber H1 and at least one low-beam chamber L1 may be separately formed. Further, the first low-beam chamber L1 and the second low-beam chamber L2 may be also separately formed.

The present invention is not intended to be limited to each of the above embodiments. Each embodiment may be combined or modifications such as various design changes may be applied thereto, based on the knowledge of those skilled in the art. New embodiments obtained by such combinations or modifications are also included in the scope of the present invention. These new embodiments have respective effects of the embodiments combined or modified.

In each of the above embodiments, the front end side of each member is hooked and fixed and the rear end side thereof is fixed by the fixing mechanism 170. However, the front end side of each member may be fixed by the fixing mechanism 170 and the rear end side thereof may be hooked and fixed. Meanwhile, from the viewpoint of avoiding that the travelling of light to the front of the lamp 100 is hindered, it is desirable that the front end side of each member is hooked and fixed.

In each of the above embodiments, the lamp 100 is mounted on the vehicle headlamp device 10. However, the present invention is not particularly limited to this configuration. The lamp 100 can be widely utilized as a lamp other than a vehicle lamp. For example, the lamp 100 can be widely utilized as a general lighting such as illumination lamps in the indoor and outdoor, a lamp in trains, aircrafts, ships and construction machinery, etc., and various illumination devices for industrial or commercial applications. Further, in each of the above embodiments, the LED has been described as an example of the light source 111. However, the light source 111 is not limited to the LED. For example, the light source may be a semiconductor laser or a bulb or the like.

What is claimed is:

1. A lamp comprising:
   a substrate having a light source mounting surface;
   a heat-dissipation member configured to dissipate heat of a light source mounted on the light source mounting surface;
   an optical member configured to deflect light emitted from the light source mounted on the light source mounting surface; and
   a heat-transfer member having at least one of flexibility and elasticity and configured to transfer the heat of the light source mounted on the light source mounting surface from the substrate to the heat-dissipation member,
   wherein the substrate is disposed between the optical member and the heat-dissipation member,
   wherein the heat-transfer member is disposed at a position located between the substrate and the heat-dissipation member and overlapping with at least the light source mounted on the light source mounting surface, as seen from a stacked direction of the substrate and the heat-dissipation member,
   wherein a first end side of the heat dissipation member is fixed to a first end side of the optical member by a fixing mechanism, wherein a second end side of the heat dissipation member and a second end side of the optical member are hooked and fixed via a hooking structure such that the heat dissipation member and the optical member are prevented from being displaced in a direction away from each other, and wherein the hooking structure provides a force between the heat dissipation member and the optical member, with the heat-transfer member as a support point therefor.

2. The lamp according to claim 1, wherein the hooking structure is a claw portion that is part of one of the heat dissipation member and the optical member, and wherein the second end side of the other of the heat dissipation member and the optical member is hooked by the claw portion.

3. The lamp according to claim 2, wherein the fixing mechanism comprises a fastening member, wherein the heat-dissipation member has a first portion in contact with the heat-transfer member in a thermally conducting manner, a second portion having an insertion hole for the fastening member, and a connection portion to connect the first portion and the second portion to each other, and wherein the first portion and the second portion are spaced apart from each other at a region excluding the connection portion.

4. The lamp according to claim 3, wherein the heat-dissipation member has a narrow portion and a wide portion in a region from an end of the connection portion in contact with the first portion to the insertion hole of the second portion, a width of the narrow portion being narrower than a width of the wide portion.

5. The lamp according to claim 1, wherein the hooking structure is a locking portion that is part one of the heat dissipation member and the optical member, that extends substantially parallel to the stacked direction, and that has an opening, and wherein the other of the heat dissipation member and the optical member is inserted through the opening to fix the heat dissipation member to the optical member.

6. The lamp according to claim 5, wherein the fixing mechanism comprises a fastening member, wherein the heat-dissipation member has a first portion in contact with the heat-transfer member in a thermally conducting manner, a second portion having an insertion hole for the fastening member, and a connection portion to connect the first portion and the second portion to each other, and wherein the first portion and the second portion are spaced apart from each other at a region excluding the connection portion.

7. The lamp according to claim 6, wherein the heat-dissipation member has a narrow portion and a wide portion in a region from an end of the connection portion in contact with the first portion to the insertion hole of the second portion, a width of the narrow portion being narrower than a width of the wide portion.

8. The lamp according to claim 1, wherein the fixing mechanism comprises a fastening member, wherein the heat-dissipation member has a first portion in contact with the heat-transfer member in a thermally conducting manner, a second portion having an insertion hole for the fastening member, and a connection portion to connect the first portion and the second portion to each other, and wherein the first portion and the second portion are spaced apart from each other at a region excluding the connection portion.

9. The lamp according to claim 8, wherein the heat-dissipation member has a narrow portion and a wide portion in a region from an end of the connection portion in contact with the first portion to the insertion hole of the second portion, a width of the narrow portion being narrower than a width of the wide portion.

* * * * *